US011126941B1

(12) United States Patent
Schlintl et al.

(10) Patent No.: US 11,126,941 B1
(45) Date of Patent: Sep. 21, 2021

(54) WORKFORCE DESIGN: DIRECT AND INDIRECT LABOR PLANNING AND UTILIZATION

(71) Applicants:Martin Schlintl, Glan (AT); David Wetl, Pischeldorf (AT); Hans Plienegger, Friesach (AT); Ivan Prnja, Vienna (AT)

(72) Inventors: Martin Schlintl, Glan (AT); David Wetl, Pischeldorf (AT); Hans Plienegger, Friesach (AT); Ivan Prnja, Vienna (AT)

(73) Assignee: Flextronics AP, LLC, Broomfield, CO (US)

( * ) Notice: Subject to any disclaimer, the term of this patent is extended or adjusted under 35 U.S.C. 154(b) by 68 days.

(21) Appl. No.: 15/135,303

(22) Filed: Apr. 21, 2016

Related U.S. Application Data

(60) Provisional application No. 62/151,354, filed on Apr. 22, 2015.

(51) Int. Cl.
*G06Q 10/06* (2012.01)
*G06Q 10/10* (2012.01)

(52) U.S. Cl.
CPC ... *G06Q 10/063116* (2013.01); *G06Q 10/103* (2013.01)

(58) Field of Classification Search
CPC ............... G06Q 10/063116; G06Q 10/103
USPC ........................................... 705/7.17
See application file for complete search history.

(56) References Cited

U.S. PATENT DOCUMENTS

| 4,563,739 | A | 1/1986 | Gerpheide | |
| 6,049,776 | A * | 4/2000 | Donnelly | G06Q 10/063112 700/100 |
| 6,947,905 | B1 | 9/2005 | Starr | |
| 2001/0027406 | A1* | 10/2001 | Araki | G06Q 10/063116 705/7.16 |
| 2003/0177050 | A1 | 9/2003 | Crampton | |

(Continued)

OTHER PUBLICATIONS

Krajewski et al., "Learning Curve Analysis", Operations Management, Pearson Education Inc., 2010.*

(Continued)

*Primary Examiner* — Charles Guiliano
*Assistant Examiner* — Po Han Lee
(74) *Attorney, Agent, or Firm* — Haverstock & Owens LLP

(57) ABSTRACT

The workforce design method and tool provide answers to basic logistical human resources questions such as how many people need to be staffed, what kinds of qualifications are needed, when is the staffing needed, and how efficiently are employees being utilized. The methodology and tool apply to direct labor, indirect labor and resource allocations. The methodology and tool provide previously unseen levels of staffing granularity and output period forecasting. Staffing requirements can be ascertained at any level of organizational granularity. The methodology and tool can also show staffing demands in different work areas and departments enabling the dynamic staffing of the right number of people, at the right time, with the right qualifications, in the right work areas and job families for efficient allocation. This is a bottom up approach to staffing where headcounts are determined at any desired level of organizational granularity.

14 Claims, 34 Drawing Sheets

(56) References Cited

U.S. PATENT DOCUMENTS

| | | | |
|---|---|---|---|
| 2004/0167652 A1* | 8/2004 | Ishii | G06Q 10/06316 700/100 |
| 2004/0230447 A1* | 11/2004 | Schwerin-Wenzel | G06Q 10/10 705/300 |
| 2004/0254805 A1* | 12/2004 | Schwerin-Wenzel | G06Q 10/10 705/36 R |
| 2006/0190391 A1* | 8/2006 | Cullen, III | G06Q 10/10 705/37 |
| 2007/0192157 A1* | 8/2007 | Gooch | G06Q 10/06316 705/7.14 |
| 2007/0276717 A1* | 11/2007 | Alburey | G06Q 10/06 705/7.13 |
| 2007/0294146 A1 | 12/2007 | Laksham | |
| 2008/0155015 A1 | 6/2008 | Jensen | |
| 2008/0162382 A1* | 7/2008 | Clayton | G06Q 10/06 705/500 |
| 2008/0288417 A1 | 11/2008 | Luessi | |
| 2010/0010968 A1* | 1/2010 | Redlich | G06F 17/30672 707/E17.014 |
| 2010/0023385 A1* | 1/2010 | Galvan | G06Q 10/06 705/7.42 |
| 2010/0023920 A1* | 1/2010 | Chaar | G06F 8/10 717/102 |
| 2011/0225023 A1 | 9/2011 | Evans | |
| 2012/0029967 A1 | 2/2012 | Kukreja | |
| 2013/0013369 A1* | 1/2013 | Deich | G06Q 10/06 705/7.25 |
| 2013/0275187 A1* | 10/2013 | Patel | G06Q 10/06398 705/7.42 |
| 2016/0098666 A1* | 4/2016 | Hojby | G06Q 10/063116 705/7.14 |

OTHER PUBLICATIONS

Messina, "Productivity: Measurement Formulas For the Indirect Workforce", Perspectives on Business and Economics, Lehigh Preserve, 1983.*

"Learning Curve Analysis", Operations Management, Pearson Education Inc., 2010, Krajewski et al. (Year: 2010).*

"Productivity: Measurement Formulas For the Indirect Workforce", Perspectives on Business and Economics, Lehigh Preserve, 1983, Messina (Year: 1983).*

Work Measurement, Learning Curves, and Standards, OM Supplementary Chapter A, (File Last Modified Jul. 13, 2005), Collier and Evans (Year: 2005).*

"Productivity: Measurement Formulas For the Indirect Workforce" to Messina, Jan. 1, 1983 (Year: 1983).*

Krajewski et al., "Learning Curve Anlaysis", Operations Management, Pearson Education Inc., 2010.

* cited by examiner

DL-MPS HC Planning

| | | | 1-Jan<br>Week 1 | 8-Jan<br>Week 2 | 15-Jan<br>Week 3 | 22-Jan<br>Week 4 | 29-Jan<br>Week 5 | 5-Feb<br>Week 6 | 12-Jan<br>Week 7 | 19-Jan<br>Week 8 |
|---|---|---|---|---|---|---|---|---|---|---|
| DEMAND | IE | Calculated H/C | 4,137 | 3,937 | 4,232 | 3,999 | 3,722 | 3,948 | 3,768 | 3,751 |
| | | EXTRA H/C calculated by IE | | 63 | | | | | | |
| | | IE calculated H/C demand | 4,137 | 4,000 | 4,232 | 3,999 | 3,722 | 3,948 | 3,768 | 3,751 |
| | OPS | Expected Ineffiency % | 10% | 10% | 10% | 10% | 10% | 10% | 10% | 10% |
| | | Extra H/C base on Inefficiency % | 414 | 400 | 423 | 400 | 372 | 395 | 377 | 375 |
| | | Extra H/C (manually entered) | 71 | 146 | 96 | 86 | 141 | 98 | 85 | 85 |
| | | Expected additional H/C demand (Abnormal Situation) | 485 | 546 | 519 | 486 | 513 | 493 | 462 | 460 |
| | HR | Inoperative time & absenteeism rate % | 4.8% | 4.8% | 4.8% | 4.8% | 4.8% | 4.8% | 4.8% | 4.8% |
| | | Inoperative time & absenteeism rate H/C | 222 | 218 | 228 | 215 | 203 | 213 | 203 | 202 |
| | | Total H/C Demand | 4,844 | 4,765 | 4,979 | 4,700 | 4,438 | 4,654 | 4,433 | 4,413 |
| SUPPLY | | Workday H/C | actual & projected H/C | 4,605 | 4,494 | 4,387 | 4,281 | 4,179 | 4,078 | 3,980 | 3,885 |
| | | Local DL | 3,224 | 3,146 | 3,071 | 2,997 | 2,925 | 2,855 | 2,786 | 2,719 |
| | | Foreign DL | 1,382 | 1,348 | 1,316 | 1,284 | 1,254 | 1,223 | 1,194 | 1,165 |
| | | Local DL Attrition rate | 3% | 3% | 3% | 3% | 3% | 3% | 3% | 3% |
| | | Foreign DL Attrition rate | 1% | 1% | 1% | 1% | 1% | 1% | 1% | 1% |
| | | Attrition H/C Converted from Attrition Rate (forecast) | 111 | 108 | 105 | 103 | 100 | 98 | 96 | 93 |
| | | Actual Attrition rate % | 2.82% | 1% | 0% | 0% | 0% | 0% | 0% | 0% |
| | | Transferred In H/C but under transaction in Workday (actual) | | | | | | | | |
| | | Transferred Out H/C but under transaction in Workday (actual) | | | | | | | | |
| | | On job T-loan in H/C | | | | | | | | |
| | | T-loan out H/C | | | | | | | | |
| | HR | Total Available H/C after Attrition (forecasted) | 4,494 | 4,387 | 4,281 | 4,179 | 4,078 | 3,980 | 3,885 | 3,792 |
| | | H/C variance (Demand vs Actual) | -349 | -378 | -698 | -522 | -360 | -674 | -548 | -621 |
| | | additional H/C due to previous Hiring Plan | | | | 100 | 100 | 170 | 170 | 170 |
| | | Local DL Hiring | | | | 70 | | 50 | | |
| | | Foreign DL Hiring | | | | 30 | | 20 | | |
| | | actual hiring H/C(offered#) | | | 219 | 21 | 122 | 150 | 245 | 338 |
| | | Total Available H/C with Fulfilment of Hiring Plan (forecasted) | 4,494 | 4,387 | 4,500 | 4,279 | 4,178 | 4,150 | 4,055 | 3,962 |
| | | Accumulated GAP | -349 | -378 | -479 | -422 | -260 | -504 | -378 | -451 |
| MPS | MPS | Hiring Forecast (strategic Decision) | | | | | | | | |
| | | Agreed H/C MPS plan | | | 4,500 | 4,300 | 4,300 | 4,300 | 4,300 | 4,300 |
| | | H/C GAP | | | -479 | -400 | -138 | -354 | -133 | -113 |

| Month | Jan. | Feb. | Mar. | May | Jun. | Jul. | Aug. |
|---|---|---|---|---|---|---|---|
| Shipments | 850 | 900 | 1000 | 1200 | 900 | 850 | 800 |
| Factor | 100/person | 100/person | 100/person | 100/person | 100/person | 100/person | 100/person |
| H/C | 8.5 | 9 | 10 | 12 | 9 | 8.5 | 8 |

| Parameter | 2015/01 > | 2015/0 | | 05 > | 2015/06 > | 2015/07 > |
|---|---|---|---|---|---|---|
| search | | | | | | |
| □ # Invoices | 1455 | 1484 | 1555 | 1506 | 1506 | 1506 |
| □ # Customers (weighted) | 28 | | 37 | 36 | 33 | 31 | 32 |
| □ # Manufactured Items - count | 277 | 301 | 303 | 276 | 299 | 319 | 319 |
| □ # Customers - NPI (weighted) | 13 | 15 | 22 | 17 | 18 | 17 | 18 |
| □ # OPO + PPO | 3188 | 2688 | 1876 | 1028 | 1043 | 1531.8 | 1394.5 |
| □ # Supplier | 278 | 268 | 263 | 281 | 232 | 262.6 | 274.6 |
| □ # Projekte - TestDevelopment | 54 | 54 | 54 | 54 | 52 | 56 | 54 |
| □ # Projekte - TechnologyRoadmap | 5 | 5 | 5 | 5 | 6 | 6 | 5 |

Period: 2015/05

Delta: Semester (-6, +6)

keep monthly snapshot of data to be able to see historical information parameter value for each month (historical and forecast)

Fig. 33

Headcount

Show Upload Options [NO]

Period [2015/06 ▼] ⟳ — Keeping monthly snapshot of the data

Department [All ▼]

Exact match [NO]   SupDeps included [NO]

Planning Dep FTE (489.44) — Full Time Equivalent summary for the data displayed

JobFamily [All ▼]

Matrix O... ▼

⟳ Reset   📥 Export data

| Department ▼ | Matrix Organi... ▼ | Job Family ▼ | Legal Name ▼ | Job Title ▼ | On leave ▼ | Classification ▼ | GBS Internal ▼ | FTE% ▼ | Pres |
|---|---|---|---|---|---|---|---|---|---|
| Finan... | | Accounting | | Accounting | false | IDL | | 100% | Ch |
| Finan... | | Accounting | | Accounting | false | IDL | | 100% | Ch |
| Finan... | | Accounting | | Accounting Ma... | false | IDL | | 50% | Ch |
| Finan... | | Accounting | | Accounting Ma... | false | IDL | | 100% | Ch |
| Infor... | | IT Technical | | Analyst, SQL... | false | IDL | | 100% | Fr |
| Infor... | | IT Technical | | Analyst, Windo... | false | IDL | | 100% | Fr |

Detail information for each employee to help verifying the data

Fig. 34

WORKFORCE DESIGN: DIRECT AND INDIRECT LABOR PLANNING AND UTILIZATION

RELATED APPLICATIONS

This Patent application claims priority under 35 U.S.C. 119 (e) of the U.S. Provisional Application, Ser. No. 62/151,354, filed Apr. 22, 2015, and entitled "Workforce Design: Direct and Indirect Labor Planning and Utilization". This application incorporates U.S. Provisional Application, Ser. No. 62/151,354 in its entirety by reference.

FIELD OF THE INVENTION

The present invention is generally directed to workforce design methodologies and tools. More specifically, the present invention is directed to workforce design methodologies and tools for direct and indirect labor planning and utilization.

BACKGROUND OF THE INVENTION

In the past, labor costs were relatively low, especially when able to offshore labor requirements to global areas having cheap labor. Now, labor costs are rising and it is becoming more important to more tightly manage labor requirements. Labor can be broken down into direct labor and indirect labor. Direct labor refers to those people that are directly involved in manufacturing or producing products and services, for example manufacturing line operators that manufacture a product. Indirect labor refers to those people that support the direct labor employees. Examples of indirect labor are those people working in the human resources and IT (information technology) departments. Related to labor staffing allocations, the number of employees is conventionally driven by revenue. If revenue increases, then there is a need for more people. If revenue decreases, then there is less need for people. Once the total number of employees is determined based on revenue, that headcount is allocated down the company organizational chain to various departments and work areas. This is referred to as a top down approach to staffing. There is no finer analysis performed as to where exactly to increase or decrease headcount or which qualifications are required. Specifically, no tool or explicit methodology is used. Instead, more of a "gut feeling" is used by managers to determine changing staffing needs.

SUMMARY OF THE INVENTION

The workforce design method and tool provide answers to basic logistical human resources questions such as how many people need to be staffed, what kinds of qualifications are needed, when is the staffing needed, and how efficiently are employees being utilized. The methodology and tool apply to direct labor, indirect labor and resource allocations. The workforce design method and tool provide previously unseen levels of staffing granularity and output period forecasting. Staffing requirements can be ascertained at any level of organizational granularity. Levels of organizational and job granularity include the whole organization, site, department, sub-department, work area, job family and job profile. The workforce design method and tool can also show staffing demands in different work areas and departments enabling the dynamic staffing of the right number of people, at the right time, with the right qualifications, in the right work areas and job families for efficient allocation. This is a bottom up approach to staffing where headcounts are determined at any desired level of organizational granularity. Bottom up approach aggregates from job profile and/or job family and/or department to site level.

BRIEF DESCRIPTION OF THE DRAWINGS

Several example embodiments are described with reference to the drawings. The example embodiments are intended to illustrate, but not to limit, the invention. The drawings include the following figures:

FIG. 6 illustrates an exemplary MPS table.

FIG. 13 illustrates a screen shot of an exemplary import function used in the RAPTOR application according to some embodiments.

FIG. 14 illustrates a screen shot of an exemplary transfer function used in the RAPTOR application according to some embodiments.

FIG. 15 illustrates a screen shot of an exemplary OL function used in the RAPTOR application according to some embodiments.

FIG. 16 illustrates a screen shot of an exemplary claims function used in the RAPTOR application according to some embodiments.

FIG. 17 illustrates a screen shot of an exemplary configuration function used in the RAPTOR application according to some embodiments.

FIG. 33 illustrates an exemplary parameter planning and data management screen for a specific project according to some embodiments.

FIG. 34 illustrates an exemplary headcount screen.

DETAILED DESCRIPTION OF THE EMBODIMENTS

Figure 1:
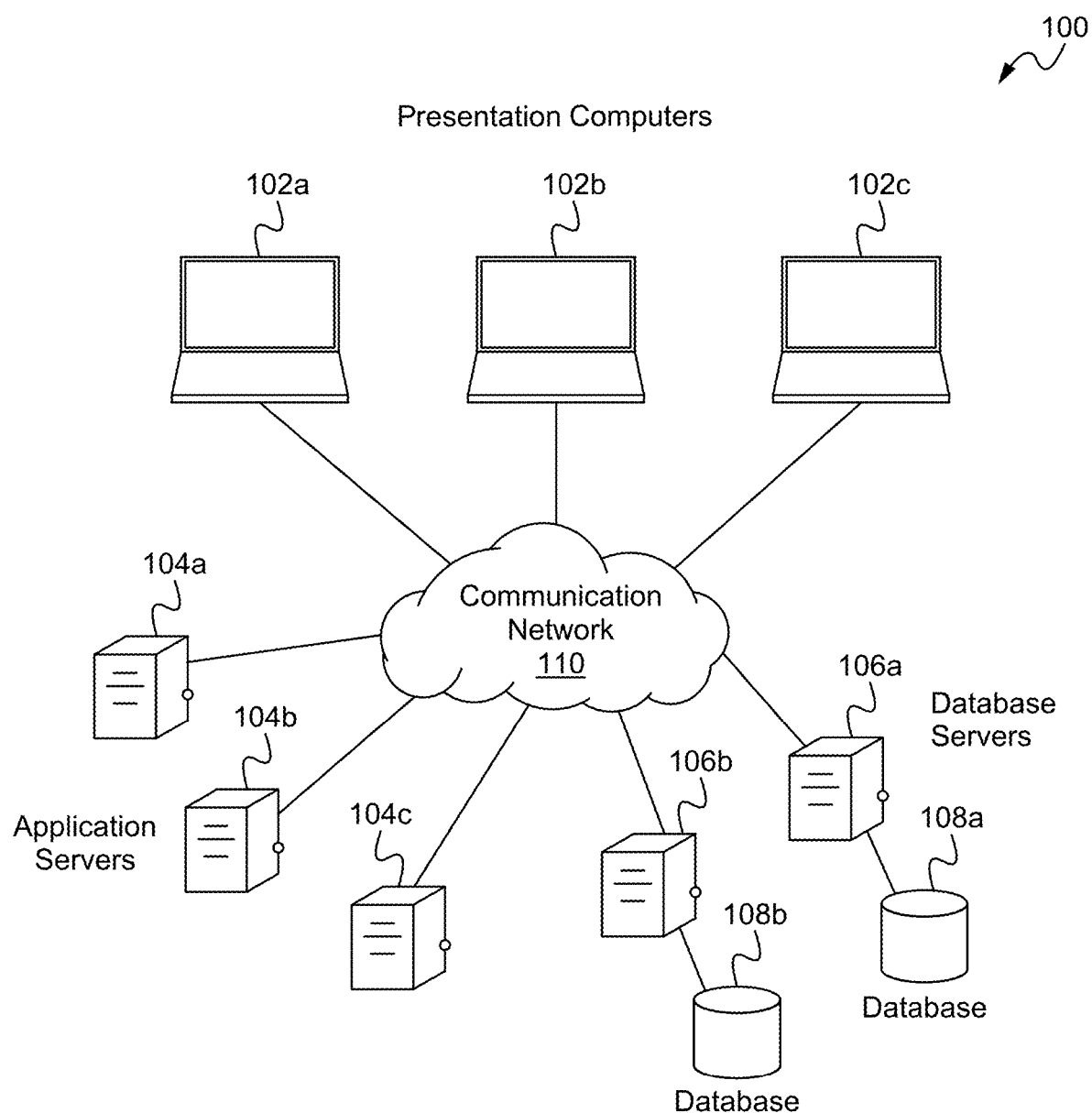
FIG. 1 illustrates a block diagram of an exemplary system configured to operate the workforce design method and tool according to an embodiment.

Embodiments of the present application are directed to a workforce design method and tool. Those of ordinary skill in the art will realize that the following detailed description of the workforce design method and tool is illustrative only and is not intended to be in any way limiting. Other embodiments of the workforce design method and tool will readily suggest themselves to such skilled persons having the benefit of this disclosure.

Reference will now be made in detail to implementations of the workforce design method and tool as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The workforce design method and tool provides a bottom up approach to staffing where headcounts are determined at a lowest organizational level, and the site level headcount is a sum of all sub-divisions corresponding to the defined organizational granularity. Determining headcount from the bottom up provides a specific, or granular, indication of where people are needed. An organizational hierarchical structure is defined having levels of granularity, such as site level, department level, sub-department level and work area, where the site level is considered the highest organizational level or highest level of granularity, and the work area is considered the lowest organizational level or lowest level of granularity. Each level in the organizational hierarchical structure is considered an organizational element. As used herein, a work area is a specific area (physical or organizational) where a set of defined activities are performed. Departmentalization is the way jobs are grouped together so that common tasks can be coordinated. Organizations can departmentalize in many different ways: functional, product, division, market, geographic, matrix. Department structure does not necessarily have to be the same as reporting line. Organizational hierarchical structures and the corresponding departmentalization are usually defined in organizational charts.

A job family is a grouping of job profiles. Job profiles within a single job family do not have to be similar at all. Each job profile is mapped to a corresponding one job family. Job families and job profiles define job level granularity where job families have a higher level of granularity than job profiles. One job family is mapped to one or more different departments or other organizational elements. Same or similar activities can be performed in different departments. Job Families are independent to organization structures.

A planning element represent an instantiation of an organizational element. In some embodiments, a specific planning element is a specific job level granularity, such as a job family or a job profile, mapped to a specific organizational element. In other embodiments, a specific planning element is a specific organizational element mapped to all job level granularities mapped to that specific organizational element.

Such an approach also enables the determination of an output duration metric related to direct labor staffing requirements. For a given project where a defined number of specific products are to be manufactured the output duration can be determined using standard times and collected efficiency statistics to calculate how long it will take on a per person and per organizational element basis to complete a project. The standard time is the total time required by the equivalent of an average skilled operator working at a normal pace, to perform a specified series of tasks using prescribed methods. Standard time includes appropriate allowances to allow for personal time, recover from fatigue, and, where necessary, an additional allowance to cover delays which may occur but have not been observed. For production lines where there are multiple dependent operations, the standard time is based on the bottleneck cycle time and the number of operators on the line. The calculated per person numbers are collated and rolled up to per organizational element numbers, which are collated and rolled up to the highest organizational level number, referred to as the output duration for the given project.

For indirect labor staffing requirements, headcounts are determined according to parameters, instead of standard times used for direct labor calculations. Indirect labor functions lack well defined standard times for performing each task. Tasks performed by indirect labor staff may or may not be as repetitive as those tasks performed by direct labor staff where the standard times are well defined. Tasks performed by indirect labor can be the same as those performed by direct labor, however duration, complexity and number of repetitions may vary as well as the number of tasks. Examples of indirect labor staff include buyers of materials or IT support. An indirect labor staffer is not always performing the same tasks that require the same time to perform each time the task is performed. For example, writing one email may be very time consuming but writing another email may not, or having one telephone call compared to another telephone call. It is difficult to measure how long it takes one buyer to buy 100,000 components or for determining how long an IT support person takes to respond to and close a help desk ticket. In the case of IT support, there is no well defined standard time for measuring how long it should take to solve a problem. It is often a function of communication, experience, resources, etc. As such, standard times are not used for indirect labor staffing determinations. Instead parameters are used such as the number of personnel to be supported, the number of computers to be supported, the number of shipments to be performed, the number of items to be purchased, etc. Parameters are the drivers for determining indirect labor staffing requirements. Some of the parameters can be custom made for labor planning but can also be established KOI (Key Operational Indicators), also known as KPI (Key Performance Indicators) parameters.

A foundation of the workforce design method and tool is the defining of a job profile for every person in the organization, for example from the line operators up to the general manager. A specific job profile defines the functions and responsibilities to be performed. An indirect labor job profile includes parameters and factors associated with that specific job. As used herein, a parameter is a driver that represents the workload for a site, department, job family or job profile, and can be measured and forecasted. A factor is a measurement of how many units of any set parameter that can be handled by one employee in the planned organizational element. For example, a specific parameter is defined as "number of shipments" and a corresponding factor is defined as "100". The more shipments are delivered from this work area, the higher the workload. In this example, one person can handle an average of 100 shipments per month.

As used herein, the workforce design method refers to the overall and specific method and process steps used to determine a current and forecasted headcount related to the completion of a specific project. The method and process steps can be defined and executed as an algorithm, such as a computer executable file, which accesses, uses and manipulates data for the stated purpose. As such, reference to the workforce design method is intended to refer to the entire concept and system for implementing the concept, where the system includes at least the algorithm and the data. As also used herein, the tool refers to any means for accessing and utilizing the workforce design method. In some embodiments, the tool is manifested as a computer application and corresponding graphical user interface (GUI) enabling a user to access and utilize the workforce design method and provide visualization of headcount, and other useful information for interpreting the headcount, at a variety of organizational levels.

FIG. 1 illustrates a block diagram of an exemplary system configured to operate the workforce design method and tool. The system 100 includes one or more presentation computers 102a, 102b, 102c, one or more applications servers 104a, 104b, 104c and one or more database servers 106a, 106b connected to one or more databases 108a, 108b. The presentation computers, application servers and the database servers are interconnected via a communication network 110. The communication network 110 can be any type of conventional communication network including, but not limited to, the internet, an intranet, a LAN and a WAN. The database servers 106a, 106b and connected databases 108a, 108b are configured to store data for use by the workforce design method and tool. For example, the data stored includes, but is not limited to, an objective of the project to be performed, defined work areas for performing the project, work area functions to be performed at each work area, job profiles defining skill functions for each employee, defined departments for performing the project, and parameters assigned to each department, as described in detail below. The application servers 104a, 104b, 104c are configured to use the data stored in the database servers 106a, 106b and connected databases 108a, 108b to determine the headcount for the project as well as performance indicators, as described in detail below. The presentation computers 102a, 102b, 102c provide user interfaces for entering data that is stored in the databases 108a, 108b and to present headcount and performance indicators determined by the application servers 104a, 104b, 104c, as described in detail below.

Figure 2:
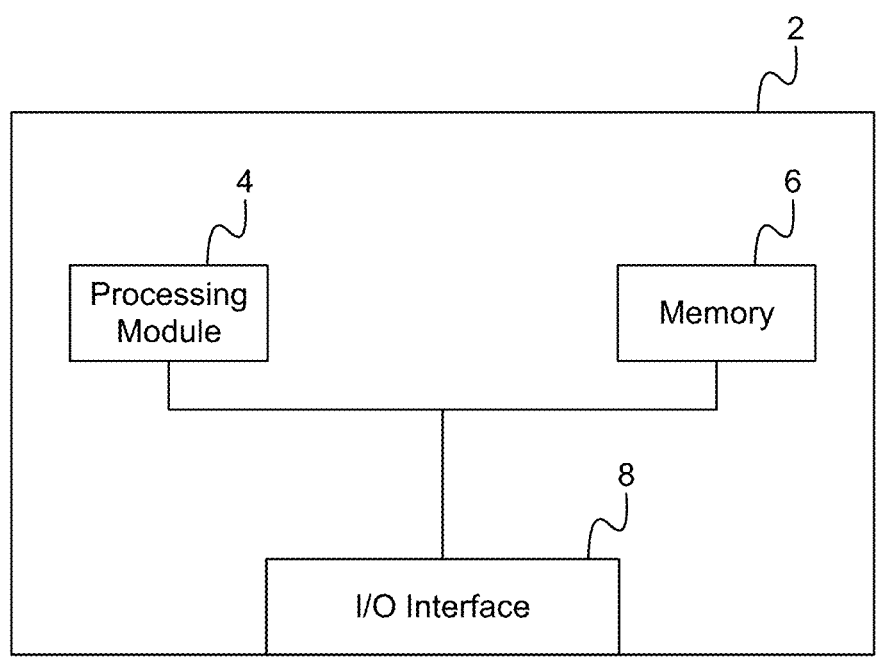
FIG. 2 illustrates a block diagram of an exemplary presentation computer in the system configured to operate the workforce design method and tool according to an embodiment.

FIG. 2 illustrates a block diagram of an exemplary presentation computer in the system configured to operate the workforce design method and tool. The presentation computer 2 includes a processing module 4, a memory 6, and an input/output (I/O) interface 8. The memory 6 can include both fixed and removable media using any one or more of magnetic, optical or magneto-optical storage technology or any other available mass storage technology. The processing module 4 is configured to control the operation of the presentation computer 2. The processing module 4 is also configured to utilize the workforce design method and tool described herein. Relevant portions of the workforce design method and tool are stored as program instructions and data within the memory 6 and processed by the processing module 4 as applications are typically processed. The I/O interface 8 can include a user interface and a network interface. The network interface can include a physical interface circuit for sending and receiving data and control communications over a conventional network. An example of a network interface includes a network card connected to an Ethernet or other type of LAN. The user interface can include one or more of the following: keyboard, mouse, monitor, display, printer, modem, touchscreen, button interface and other devices. More or less components than those shown in FIG. 2 are able to be included in the presentation computer 2.

Examples of suitable presentation computer include, but are not limited to, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a video player, a DVD writer/player, a television, a home entertainment system or any other suitable computing device.

Direct Labor

The workforce design method and tool incorporate industry standards for standard time values and industrial engineering principles used to determine direct labor staffing requirements. Industrial engineering is a branch of engineering which deals with the optimization of complex processes or systems. According to Industrial engineering is concerned with the development, improvement, and implementation of integrated systems of people, money, knowledge, information, equipment, energy, materials, analysis and synthesis, as well as the mathematical, physical and social sciences together with the principles and methods of engineering design to specify, predict, and evaluate the results to be obtained from such systems or processes. While industrial engineering is a traditional and longstanding engineering discipline subject to, and eligible for, professional engineering licensing in most jurisdictions, its underlying concepts overlap considerably with certain business-oriented disciplines such as operations management.

Industrial engineering may encompass many disciplines including, but not limited to operations management, management science, operations research, systems engineering, management engineering, manufacturing engineering, ergonomics or human factors engineering and safety engineering.

Figure 3:
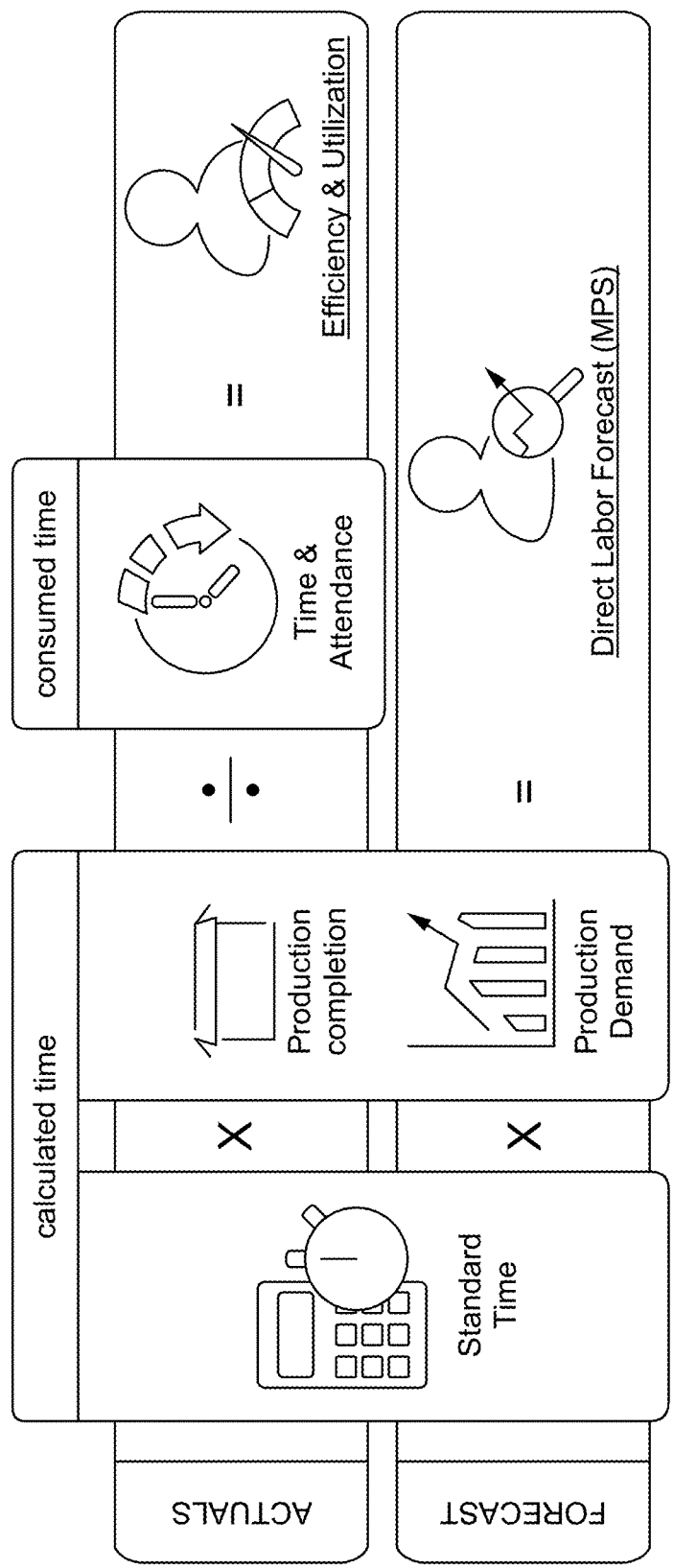
FIG. 3 illustrates an exemplary use of standard times to calculate efficiency and utilization as well as generate a direct labor forecast.

FIG. 3 illustrates an exemplary use of standard times to calculate efficiency and utilization as well as generate a direct labor forecast. The standard time is used to calculate the Direct Labor Efficiency (DLE) and the Direct Labor Utilization (DLU) performance indicators. The standard time is also used to calculate the direct labor Master Production Schedule (MPS).

Figure 4:
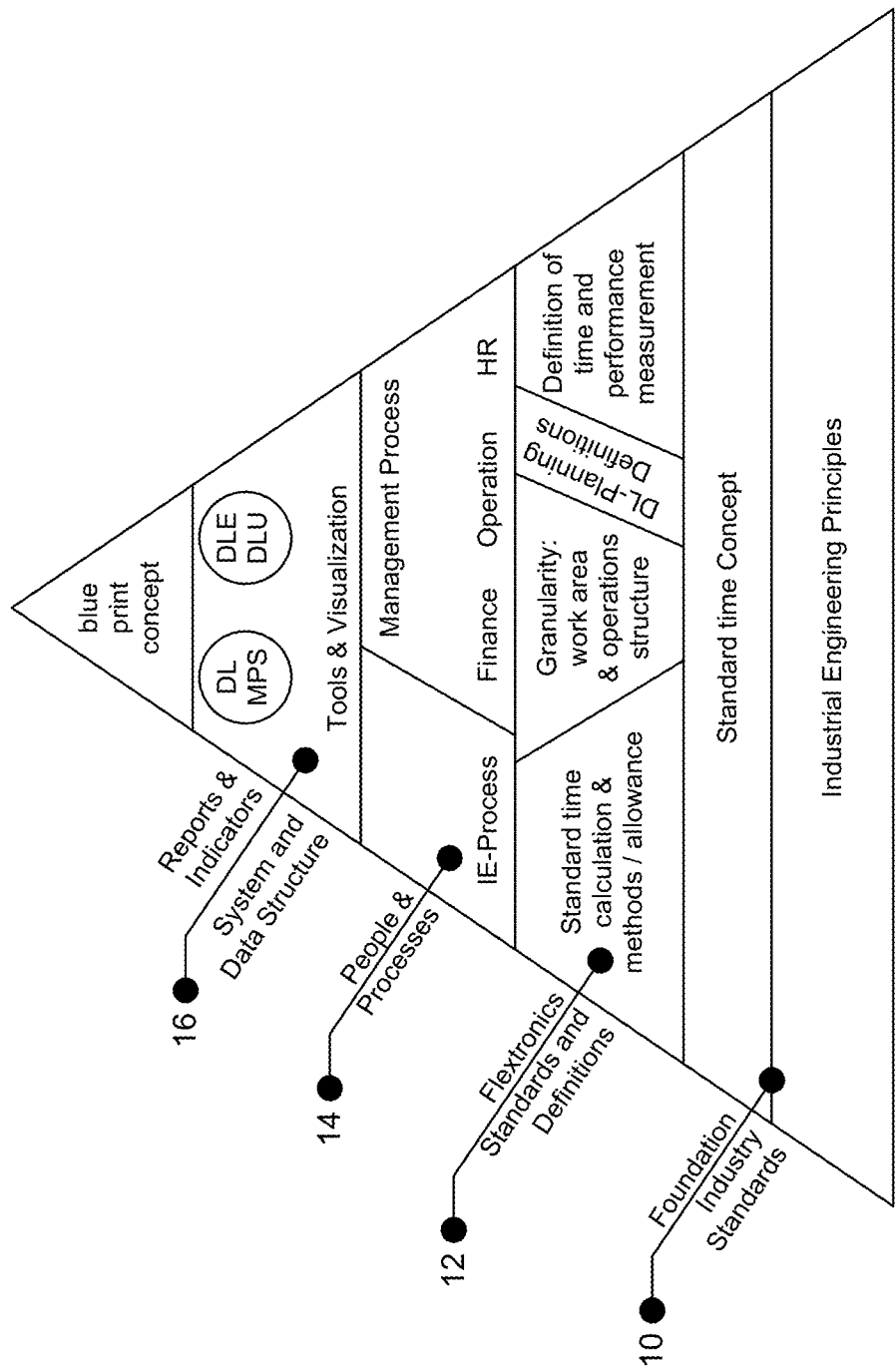
FIG. 4 illustrates a conceptual block diagram of standards and concepts used to achieve calculations for DLU, DLE and generate a direct labor forecast.

The workforce design method and tool includes a direct labor tool. The direct labor tool implements standards and concepts in order to calculate DLU, DLE and generate a direct labor forecast. FIG. 4 illustrates a conceptual block diagram of standards and concepts used to achieve calculations for DLU, DLE and generate a direct labor forecast. The diagram of FIG. 4 is directed to the direct labor portion of the workforce design method and tool. A first layer 10 includes industry standards such as the standard times and industrial engineering principles previously described. A second layer 12 defines standards and definitions used in the workforce design method and tool and correlates these standards and definitions to specific industry standards from the first layer 10. For example, the second layer 12 can define standard times calculations and method steps for specific projects to be performed. The second layer 12 also defines allowances, which refers to an uplift that goes on top of the standard time for "allowed" extra time needed for human beings and for machinery. In the case of human beings, allowance is the adjustment done to the normal time to obtain the standard time for the purpose to recover the lost time due to personal needs, fatigue, and unavoidable delays. By providing a small increase to the normal time in each cycle, the worker can still be able to cover lost time and complete the work assigned to him. In the case of machinery, allowance is the adjustment for unavoidable delays and losses due to the nature of a machine. Collection of a representative set of data and a solid analysis is needed in order to calculate the percentage that has to be added to the optimal machinery time. The second layer 12 can also define levels of granularity related to work area and operations structure such as job profiles, direct labor planning definitions and definitions of time and performance management.

A third layer 14 defines the utilization processes that incorporate the standards and definitions from the second layer 12 and forms the basis for workforce design standards. Examples of utilization processes include industrial engineering processes and management processes. The utilization processes describe each person's responsibilities within the larger context of a work area, job family and project, and how to convert information to efficiently run the processes. A fourth layer 16 is a user interface layer that present the underlying data in the form of various reports and performance indicators. Examples of direct labor performance indicators include, but are not limited to, MPS, DLE and DLU.

Figure 5:
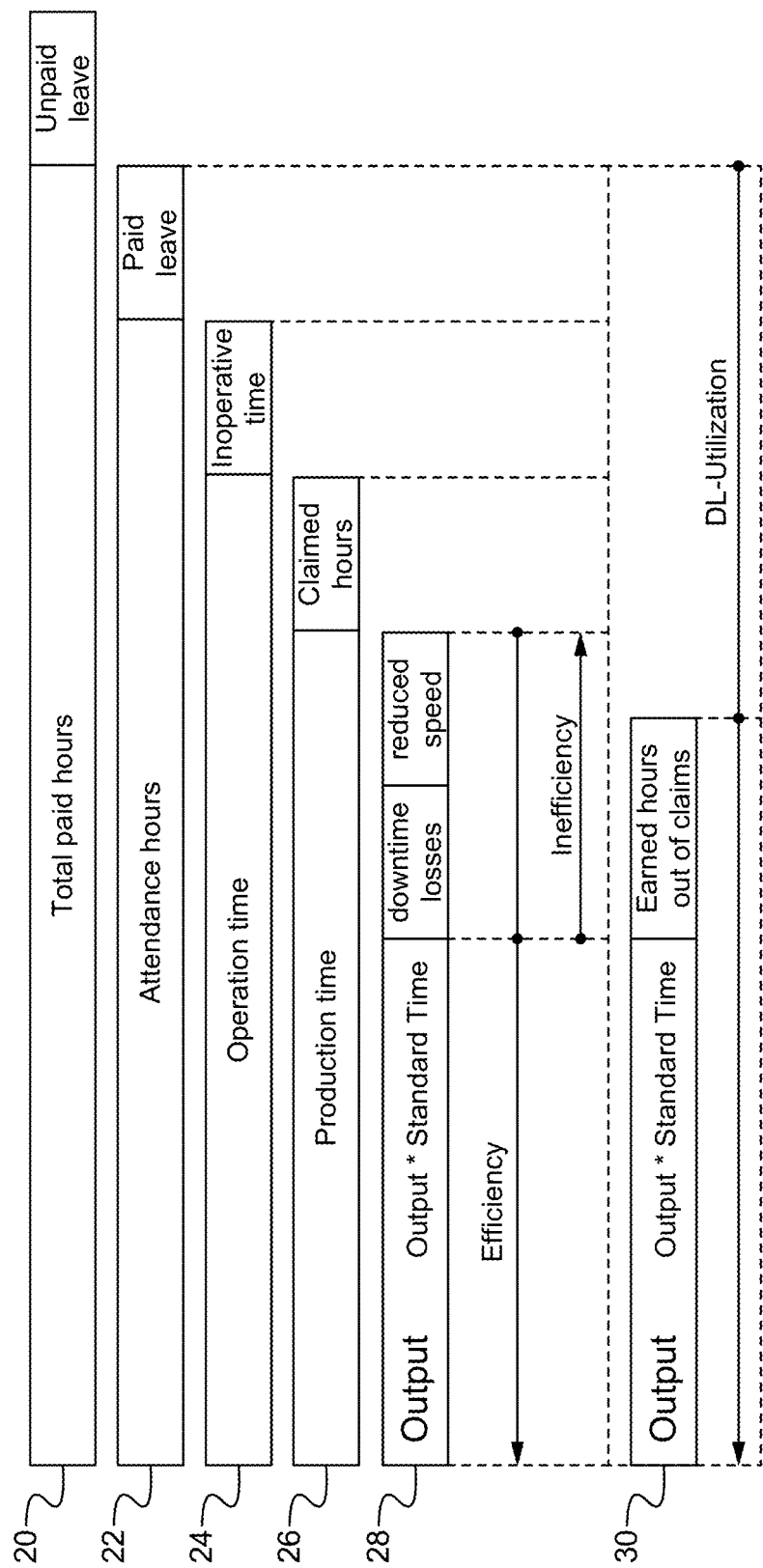
FIG. 5 illustrates a bar chart of various time parameters as related to one another.

Some performance indicators are measured as functions of various time parameters. FIG. 5 illustrates a bar chart of various time parameters as related to one another. Bar 20 represents the total hours associated with a given employee, which include total paid hours and unpaid leave. Total paid hours represents the total amount of hours that an employee is paid for whether the employee attended work or not. Unpaid leave represents those hours that the employee did not attend work and was not paid for those non-attendance hours.

Bar 22 represents a breakdown of the total hours paid from bar 20. The total hours paid can be sub-divided into attendance hours and paid leave. Attendance hours represents those hours that the employee actually spent at work. Paid leave represents non-attendance hours that the employee was paid for, such as vacation time.

Bar 24 represents a breakdown of the attendance hours from bar 22. The attendance hours can be sub-divided into operation time and inoperative time. Operation time represents those hours that the employee spent at their work, or operation, station. Inoperative time represents time spent at work but not at their work station, such as breaks or training.

Bar 26 represents a breakdown of the operation time from bar 24. The operation time can be sub-divided into production time and claimed hours. Production time represents the amount of time the employee actually spent performing the job function to which they are assigned. Claimed hours represents the amount of time the employee spent at their work station but performed a function not specifically defined by the standard time and industrial engineering principles, such as problem solving or performing additional work due to quality issues. In some embodiments, claimed hours includes three stages: hours to be claimed, hours claimed, and earnings from claims. Hours to be claimed refers to effort on the shop floor that was not planned, is not considered in the standard time calculation and is caused by a customer or supplier. Hours claimed refers to hours that are already converted or considered to be converted in a claim. A claim is a reimbursement request that should cover the losses generated by downtime or inactivity. For example, faulty parts from a supplier result in machine break down and line stoppage. This will result in a claim to cover the expenses of machine repair and inactive time, and potential damages for not being able to meet the deadline for customer. A claim can also be activities that are requested by the customer or supplier that are not defined in the original production contract that lead to extra work and therefore extra cost. Earnings from claims refers to hours that are already accepted or payed by the customers or supplier.

Bar 28 represents a measure of efficiency. As shown in bar 28, output is an optimal output metric. The optimal output metric is a measure for a specific time period and is defined as the total standard time to manufacture one of the products multiplied by a number of products manufactured during the specific time period. The optimal output metric is the optimal time it should have taken to manufacture the specific number of products according to the standard times, whereas the production time is the actual time taken to manufacture the same number of products. The difference between the production time and the optimal output metric is measured as inefficiency which can be due to downtime losses and sub-optimal speed compared to the standard times. Examples of downtime losses include, but are not limited to, time lost due to equipment setup and adjustment, process, equipment, material related, operations related and quality related. Downtime losses are generally considered as part of OL (operational losses). In some embodiments, downtime losses are calculated according to two components. A first component is the actual time the line is down, e.g. 45 minutes. This downtime component is the actual down time times the number of operators effected (3 in this case), so total downtime for this component is 45 minutes*3=135 minutes. There is an additional component associated with ramp up time to get the operators back to full speed. This is a predetermined time and weighting factor that diminishes with ramp up. There may also be people that are effected by down time other than the direct operators. These people may be direct labor downstream from the direct operators, maintenance people who fix the downtime problem and indirect labor people such as quality engineers.

A direct labor efficiency (DLE) performance indicator is defined as the optimal output metric divided by the production time metric for the specific time period. In general, DLE is a measure of how efficient a direct labor can perform their standard work. The DLE performance indicator is mainly influenced by the performance of the direct labor and the down time. In particular, DLE is defined by equation (1):

$$DLE=100*(\Sigma Production\ time-Inefficiency)/\Sigma Production\ time \quad (1)$$

Bar 30 represents a measure of utilization. In general, utilization refers to how much time of the paid hours can be utilized for productive work. As shown in bar 30, utilization is the optimal output metric plus the earned hours out of claims measured against the total paid hours shown in bar 20. Claims, such as labor efforts in hours, can be sent to a supplier or customer for reimbursement. If a claim is accepted and paid, this is measured as earned hours out of claims.

A direct labor utilization (DLU) performance indicator is defined as the sum of the optimal output metric and the earned hours out of claims divided by the total paid hours metric for a specific time period. The DLU performance indicator is mainly influenced by absenteeism, paid breaks, training, claimed hours success rate and efficiency hours. In particular, DLU is defined by equation (2):

$$DLU=100*\Sigma Earned\ hours/\Sigma Total\ paid\ hours \quad (2)$$

In other words, DLU is the percentage of all hours earned compared to the total paid hours. Earned hours refers to the time (in hours) earned out of production completion (manufactured quantity) in a given time*calculated standard time.

In some embodiments, the standard times or industrial engineering principles used by the system can be updated over time. For example, the efficiency may be expected to improve if a better method of performing a given task is developed, such as reworking the design with customer approval to use three screws instead of four screws to attach two parts. Just using three screws could lead to claims and returns from the customer side. This change impacts the standard time for the assembly of the attached parts. The baseline standard time is an initial standard time for a given task. The new standard time is based on the changed methodology. Every time the efficiency of a task is changed, an efficiency credit (if it is an improvement) is calculated. The efficiency credit is measured in time.

Measuring time in this manner provides benefits such as clear and transparent classification of time, and segregation of value-add and non-value-add time and activites. Segregation of net-production time can be relevant for the performance of an operator towards the calculation of the standard time.

Innovative charting and graphing, such as a detailed and clear structured MPS chart, segregates planning into various categories that can be clearly assigned to responsible managers. Clear responsibility is the basis for any kind of performance improvement as well as on any improvement in order to do better forecasting. FIG. 6 illustrates an exemplary MPS table. The MPS chart categories include demand, supply and MPS. MPS is direct labor demand forecasting based on the number of orders, for example the items to be produced and the corresponding standard times that determine how long it takes to produce the item. Sub-categories of demand include Industrial Engineering (IE) demand, Operations (OPS) demand and Human Resources (HR) demand. IE demand is based on standard time calculation. OPS demand shows extra demand of headcount that might be needed in order to manage problematic situations or enables operation to recover a backlog. HR demand is used to cover absenteeism and inoperative time. Supply shows a visualization of any influence factor used to project the available headcount. MPS shows management responsibility for making a decision based on the numbers in order to level volatility for people demand vs. supply.

Figure 7:
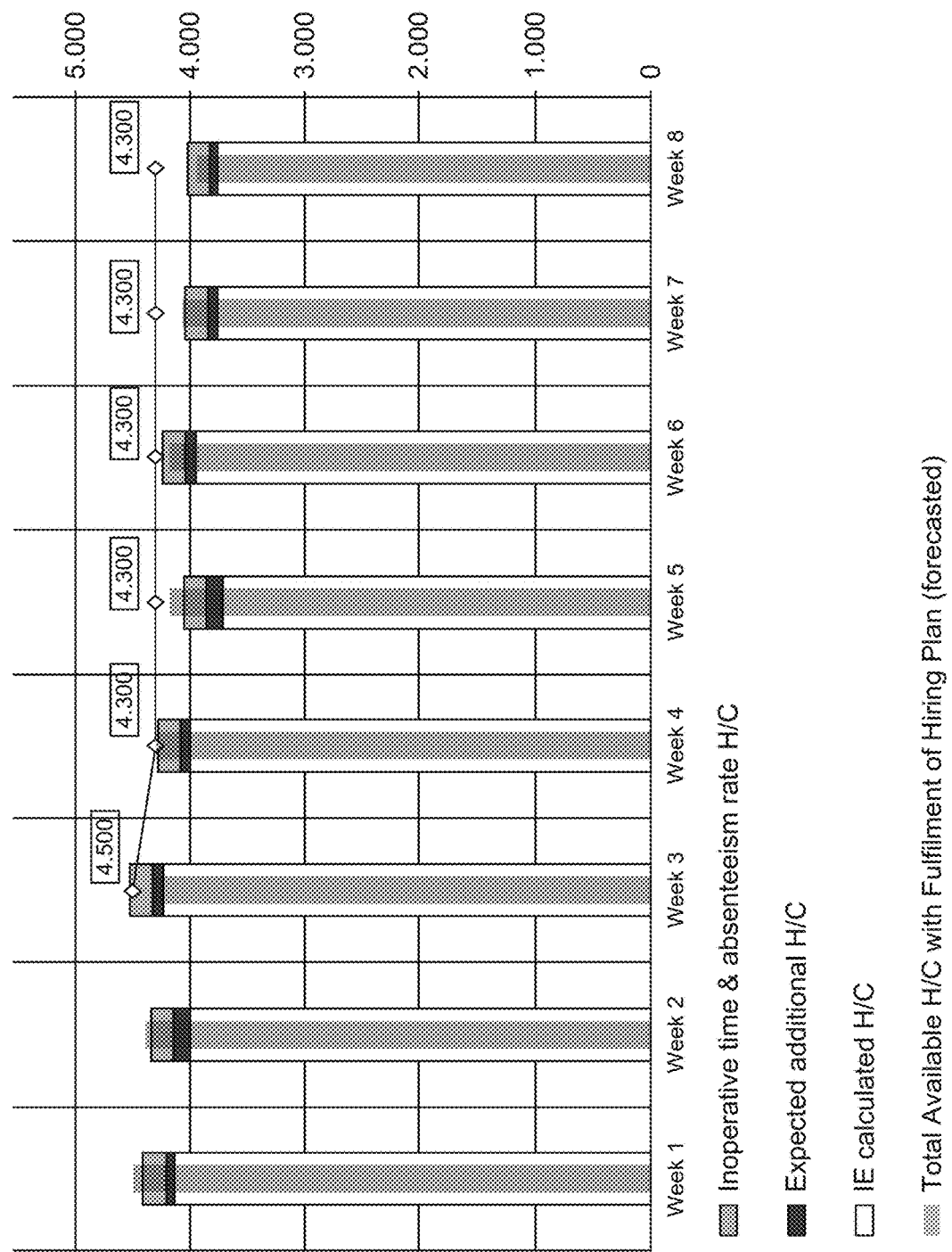
FIG. 7 illustrates an exemplary chart that shows headcount demand in relation to the available and projected headcount out of the HR-system.

FIG. 7 illustrates an exemplary chart that shows headcount demand in relation to the available and projected headcount out of the HR-system. In other words, the chart in FIG. 7 shows a headcount demand versus a headcount supply.

Figure 8:
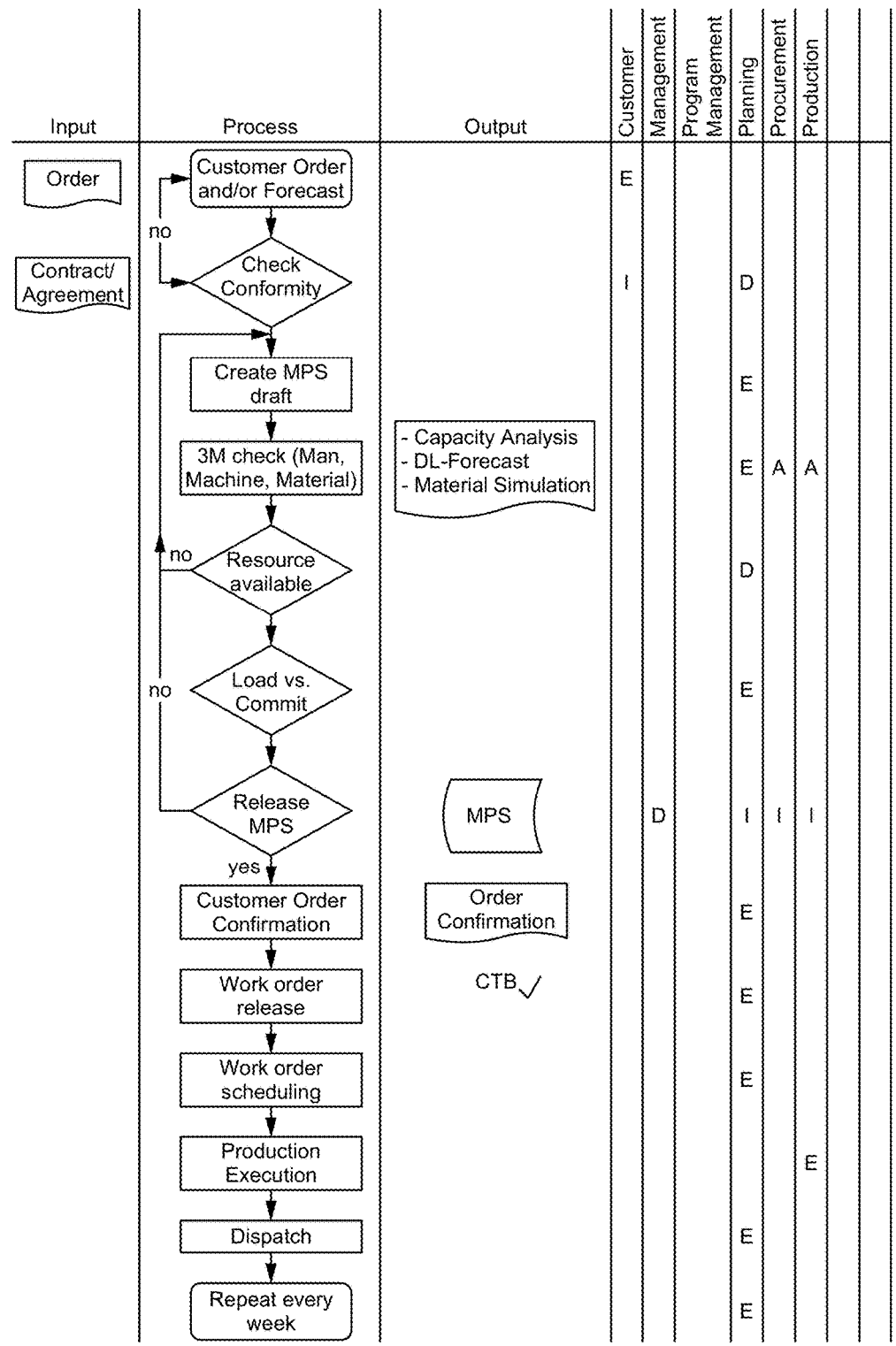
FIG. 8 illustrates an exemplary process flow chart for implementing direct labor MPS.

Successful use of the direct labor tool is based in part on the people and the processes around the concept. Examples of business processes for direct labor include definition of meeting structure and participants, and roles & responsibilities. FIG. 8 illustrates an exemplary process flow chart for implementing direct labor MPS. The start of the process begins with the customer sending in an order and/or a forecast. The planning department informs the customer that they have obtained the order and commence the planning process. At first the MPS draft is generated based on standard times and customer demand. Upon completion, the draft undergoes testing based on the 3M principle (man, machine, material) to verify the availability of resources required for completion. This step is done with assistance from production and procurement departments. If resources required are unavailable, a new MPS is generated and the process is repeated. If on the other hand the resources are available, it is management's decision whether to commit to the MPS and inform the production, procurement and planning departments. If management goes ahead with the proposed MPS, a work order is released and scheduling is performed. These steps are followed by production and dispatch of goods.

The direct labor tool provides connection between physical structure and primary organizations. The concept of the direct labor tool is using the organization structure (that is somehow aligned with the physical structure on the shop floor) of the sites and combines this with the tasks/activities performed on the shop floor in order to visualize and present the results. With this combination the performance of the individual areas on the shop floor can be broken down to the responsible people managing the performance. Such visualization drives performance improvements on the shop floor.

Figure 9:
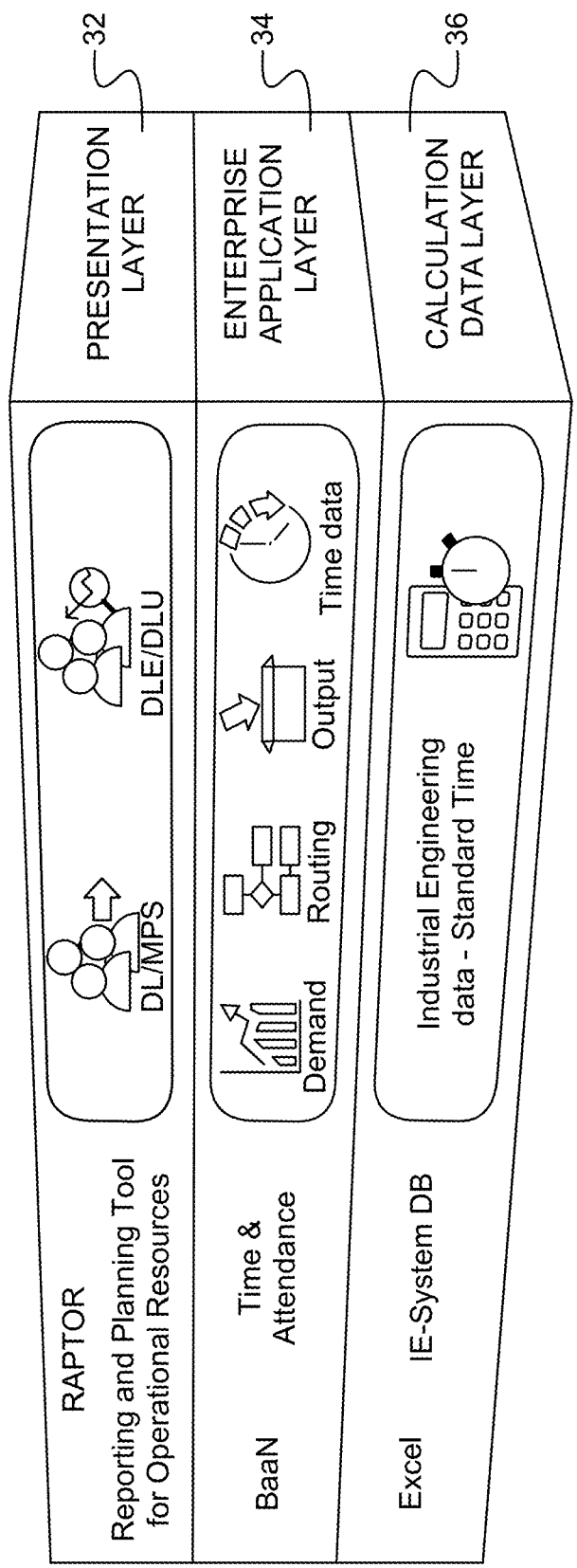
FIG. 9 illustrates an exemplary software protocol stack for implementing various aspects of the direct labor tool.

The direct labor tool is implemented in part through multiple layers of a software protocol stack. FIG. 9 illustrates an exemplary software protocol stack for implementing various aspects of the direct labor tool. The software protocol stack includes a calculation data layer 36, an enterprise application layer 34 and a presentation layer 32. RAPTOR (Reporting and Planning Tool for Operational Resources) is a reporting tool residing in the presentation layer 32 of the software protocol stack. RAPTOR receives data from the underlying enterprise application layer 34 and presents various charts/graphs for review. The RAPTOR application is fully integrated and connected with the enterprise application layer and can be considered as a reporting engine. The intelligence of the RAPTOR application is the combination of the data and the powerful graphs that visualizes the full performance of the shop floor just in one chart.

The RAPTOR application calculates and presents MPS, DLE and DLU data. MPS shows headcount planning on a project wide basis, including headcount demand as calculated above and available employee supply. This data can be presented for various time periods, both current and forecasted. The MPS information is calculated using demand data and routing data in the enterprise application layer. The demand is the quantity from customer orders. Routing is determined from the standard times and defines all the operations and interaction points needed to manufacture a product. MPS is determined by multiplying the demand by the routing to determine the number of people needed to fulfill a given project (demand).

DLE and DLU are calculated using the routing data and the output data. The output data is the actual manufactured items. Multiplying the routing by the output provides one part of the DLE and DLU performance indicators. Various types of time data, such as that described in FIG. 5, provide data on the amount of time (hours) people are spending on the manufacturing floor, how many hours people are getting paid for, etc., which is used to calculate remaining portions of the DLE and DLU.

Industrial engineering data, which is used to calculate all the standard time data, is included in the calculation data layer 36. This data is fed into the routing data in the enterprise application layer 34.

Figure 10:
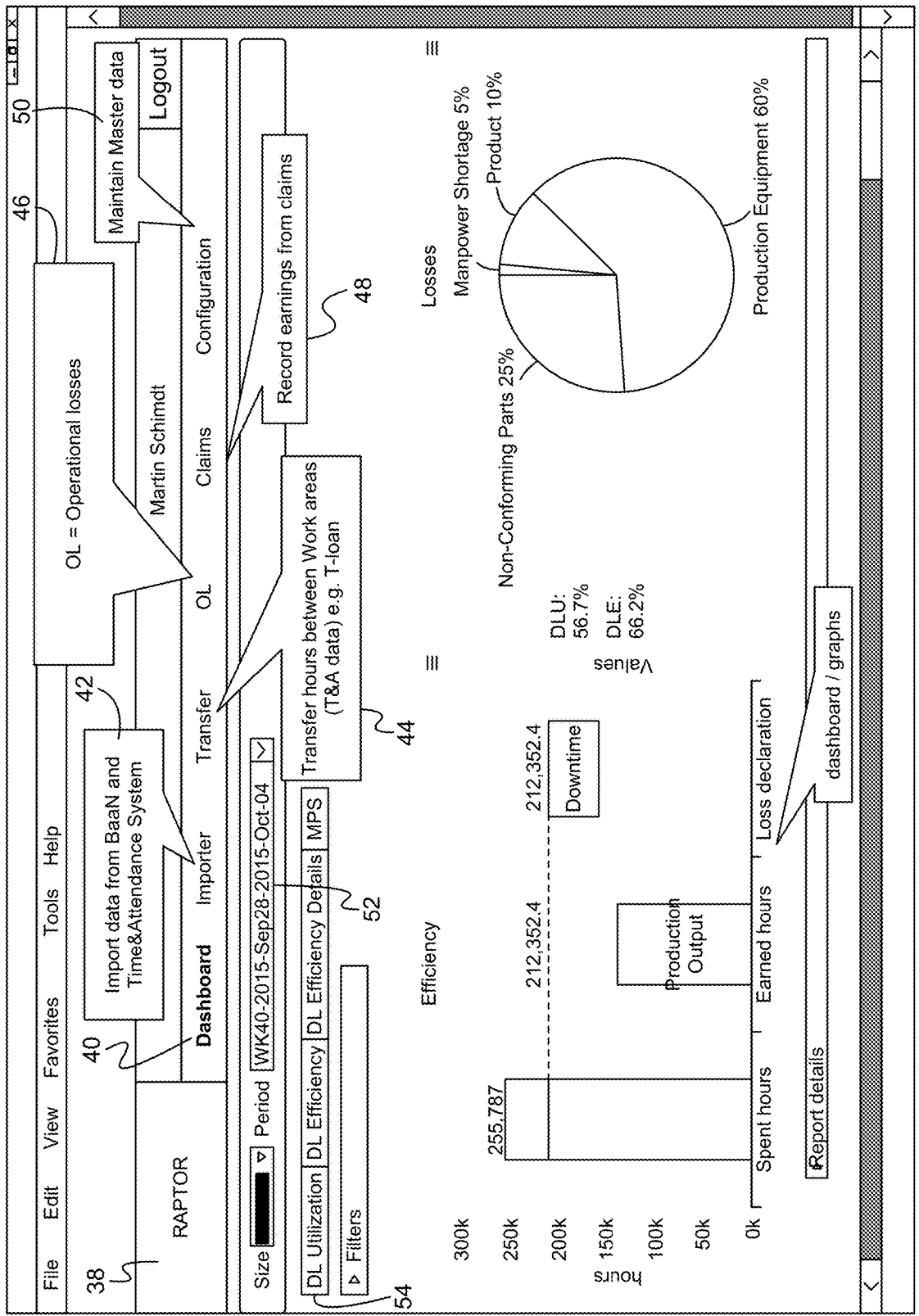
FIG. 10 illustrates a screen shot of an exemplary dashboard function used in the RAPTOR application according to some embodiments.

The RAPTOR application can be accessed through a desktop graphical user interface (GUI) on a desktop display or a mobile device. FIG. 10 illustrates a screen shot of an exemplary dashboard function used in the RAPTOR application according to some embodiments. The dashboard is selected from a main menu 38 that lists menu options including dashboard 40, importer 42, transfer 44, OL (operational losses) 46, claims 48 and configuration 50. It is understood that the main menu can include other menu items from the example shown in FIG. 10. The dashboard visually represents performance metrics, such as DLE and DLU, for a selected time period 52. For example, the left side of the dashboard shows a bar chart of spent hours, earned hours and loss declaration. Spent hours refers to all hours of the direct labor staff within that period of time. Earned hours refers to all hours earned based on the produced products within that period. Loss declaration refers to all hours within that period that can be clearly connected to downtime events. The ratio between production time and production output is the DLE (Efficiency). The gap between the dotted line (efficiency target=100%) and the production output is the loss. The gap between downtime losses in the loss declaration section down to the production output is not recorded downtimes or simply reduced speed. Above dotted line there is all DLU influencing factors. A pie chart on the right hand side shows all claimed hours recorded that caused issues on the shop floor (potential losses). The dashboard graphically shows see the gap between extra effort on the shop floor and the ratio to what is actually covered by the customer or supplier.

Figure 11:
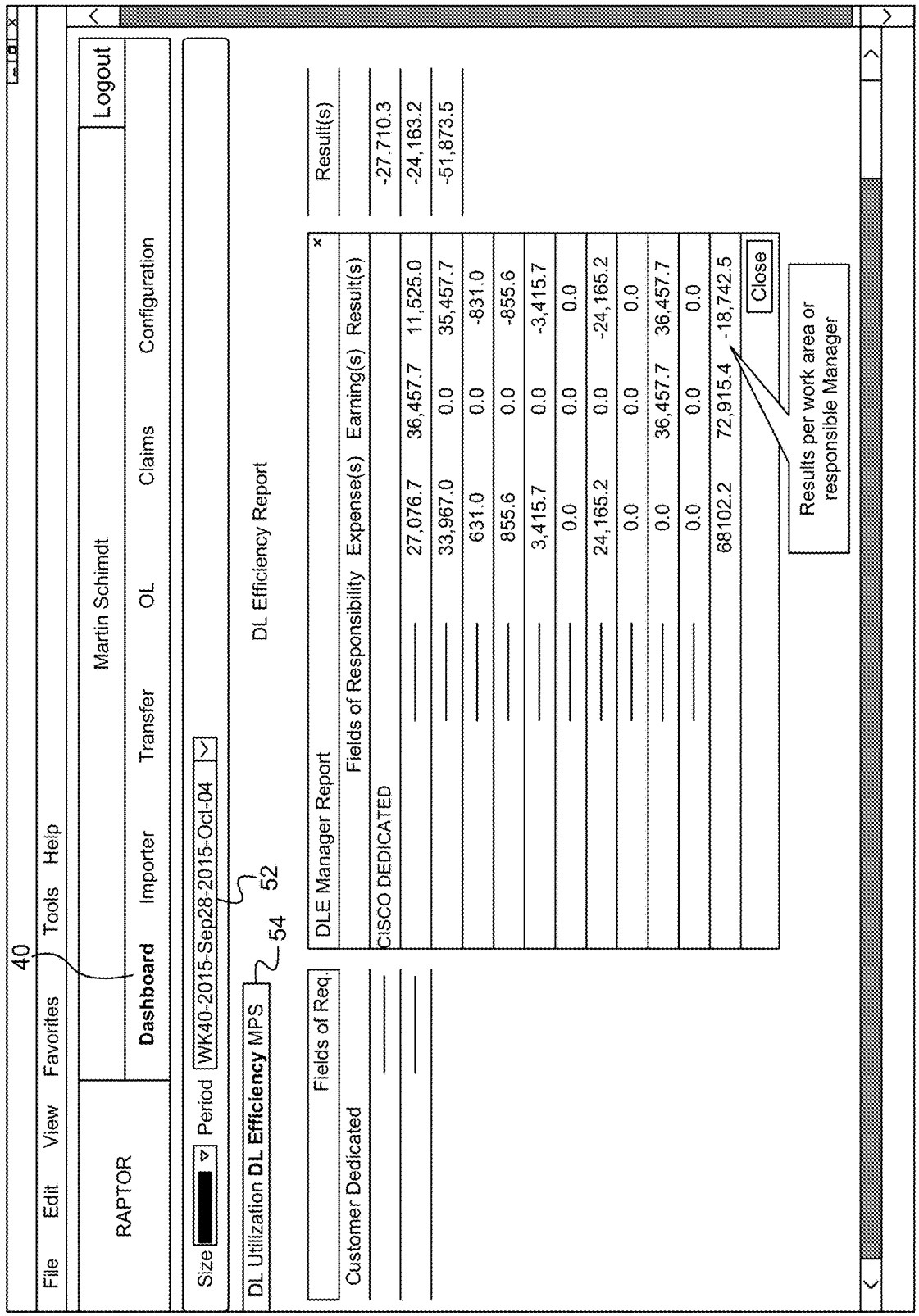
FIG. 11 illustrates a screen shot of an exemplary DLE report according to an embodiment.

A variety of different reports can be accessed from the dashboard using the reports menu 54. Examples of such reports include, but are not limited to, a DLU report, a DLE report and a MPS report. FIG. 11 illustrates a screen shot of an exemplary DLE report. The DLE report is selected from the reports menu 54 in the dashboard function of FIG. 10. In the example of FIG. 11, the efficiency for a specific work area or line manager is shown including expenses, earnings and results for that work area/line manager.

Figure 12:
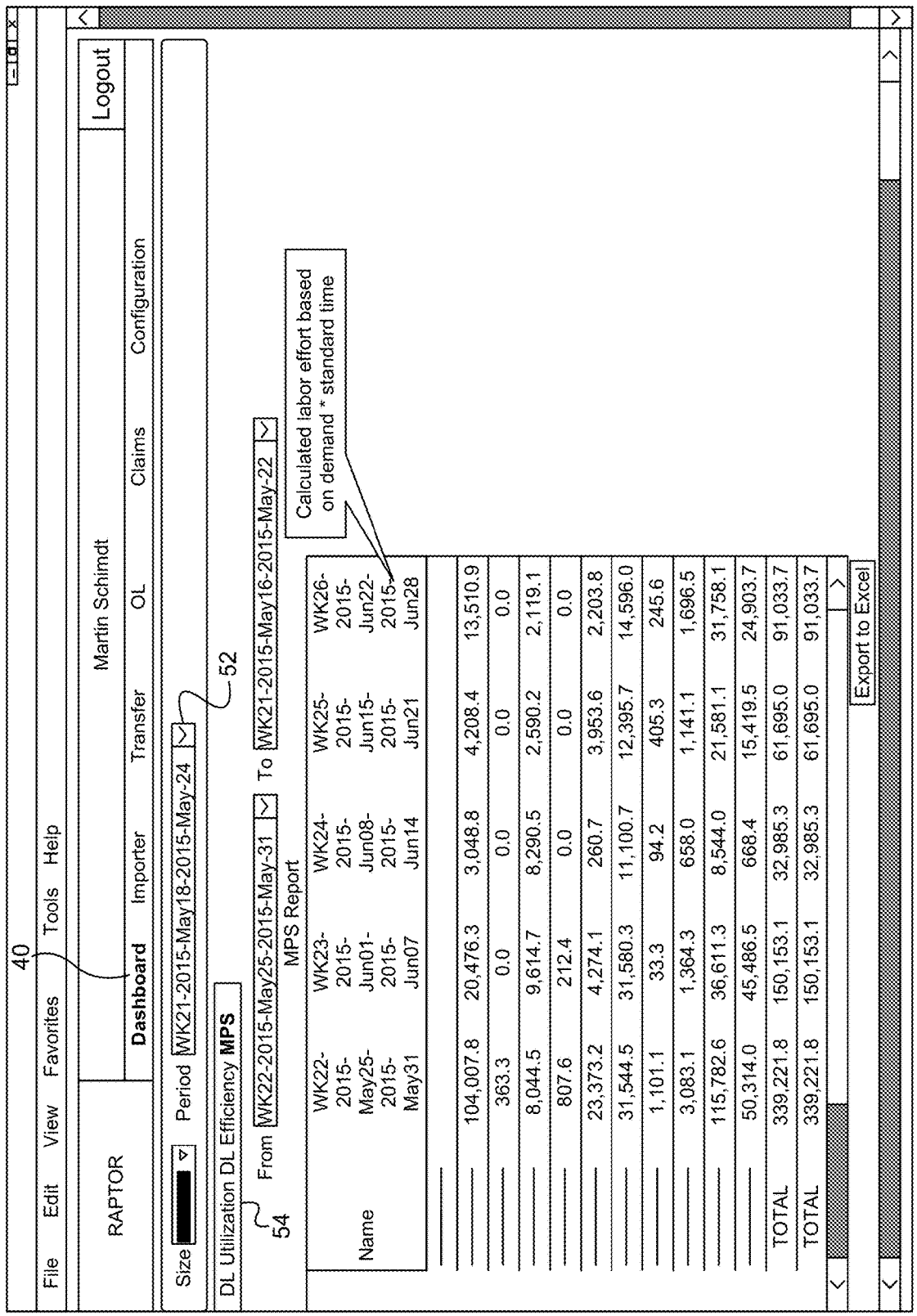
FIG. 12 illustrates a screen shot of an exemplary MPS report according to some embodiments.

FIG. 12 illustrates a screen shot of an exemplary MPS report. The MPS report is selected from the reports menu 54 in the dashboard function of FIG. 10. Each column shows data for a week. Each row shows a specific work area. The number within each cell is the number of people required for the given week/work area. The calculated labor effort for each cell is based on demand*standard time.

Figure 13:
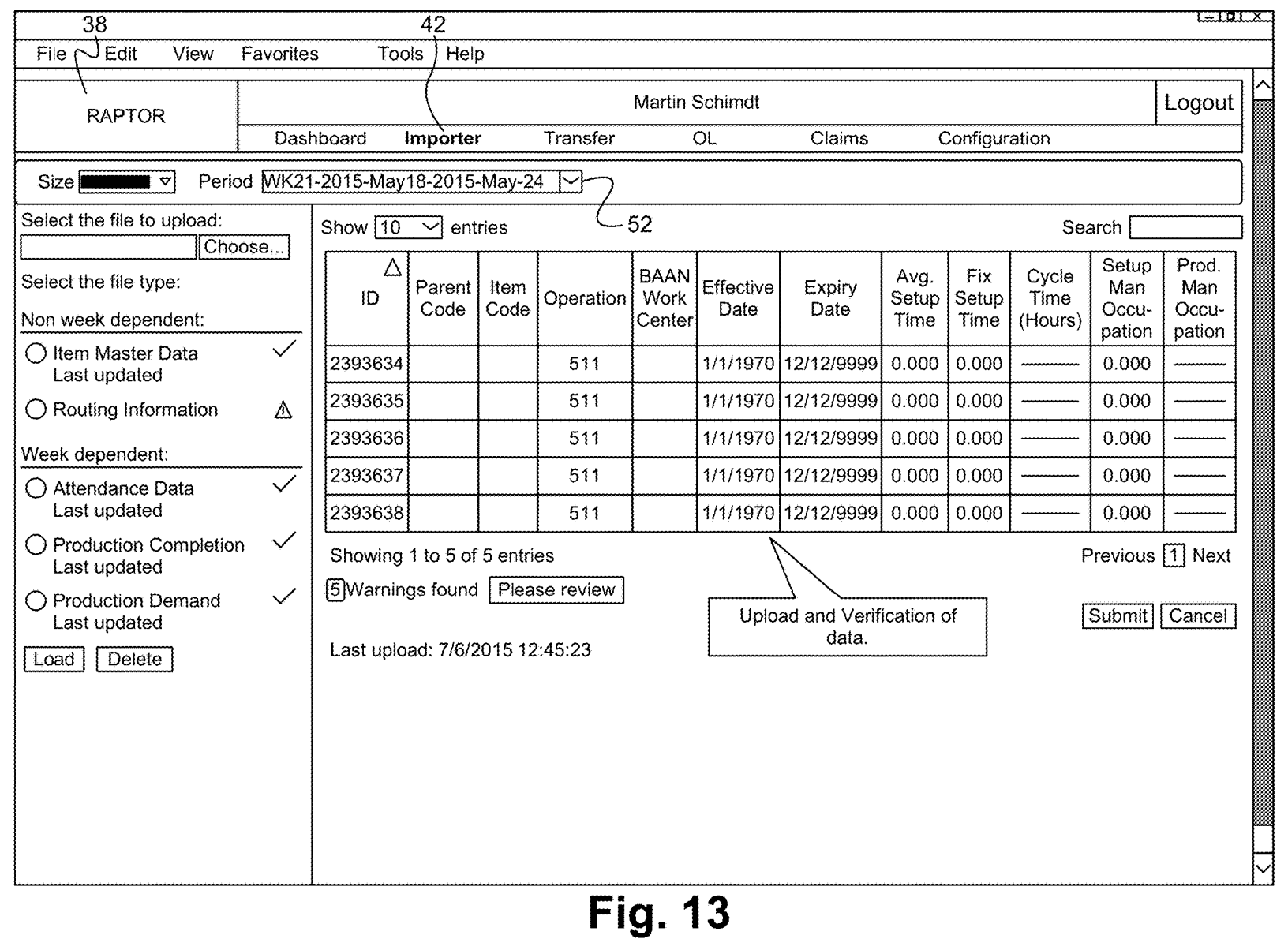

FIG. 13 illustrates a screen shot of an exemplary import function used in the RAPTOR application according to some embodiments. The import function is selected from the importer menu option 42 in the main menu 38. The import function enables uploading and verification of data into the RAPTOR application. Data is imported from the enterprise application layer of the software protocol stack, such as the demand, routing, output and time data.

Figure 14:
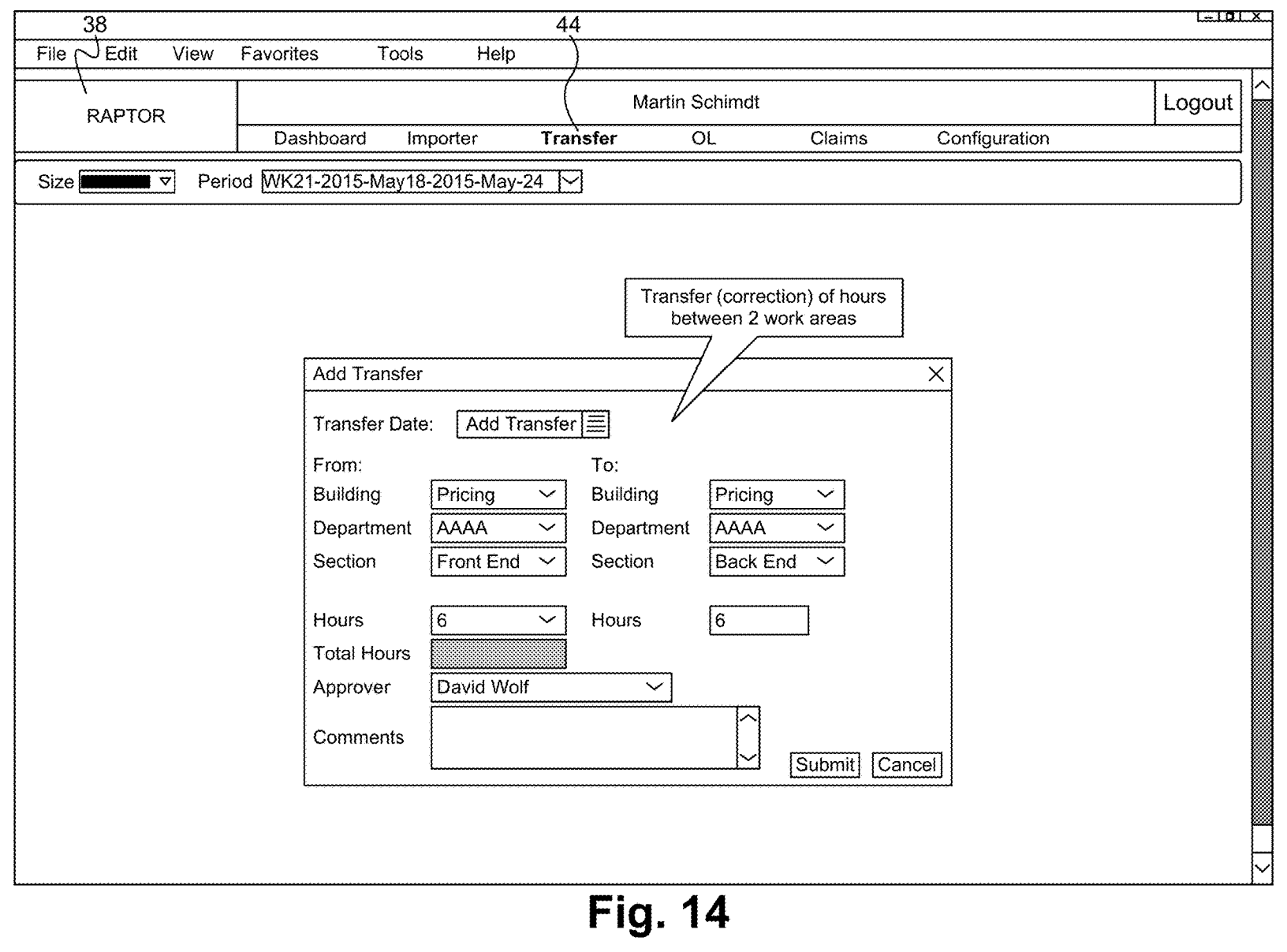

FIG. 14 illustrates a screen shot of an exemplary transfer function used in the RAPTOR application according to some embodiments. The transfer function is selected from the transfer menu option 44 in the main menu 38. The transfer function enables the transfer (correction) of hours between two work areas. For example, when there is a transfer of personal from one work area to another work area, a transfer request needs an approval of the manager of the receiving work area. Once the request is approved the transfer function provides the correction of the attendance hours information.

Figure 15:
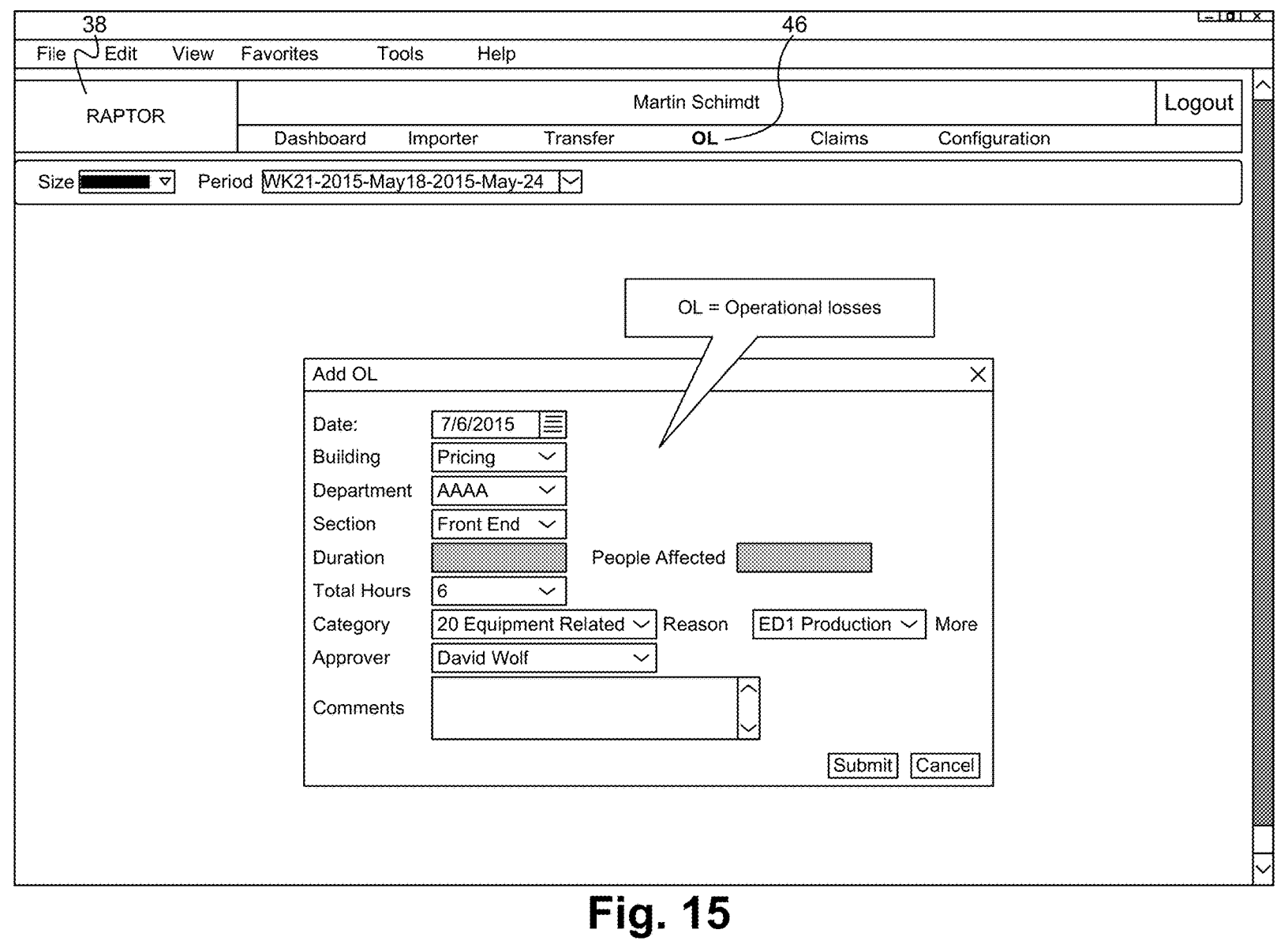

FIG. 15 illustrates a screen shot of an exemplary OL function used in the RAPTOR application according to some embodiments. The OL function is selected from the OL menu option 46 in the main menu 38. The OL function enables input of downtimes and claims.

Figure 16:
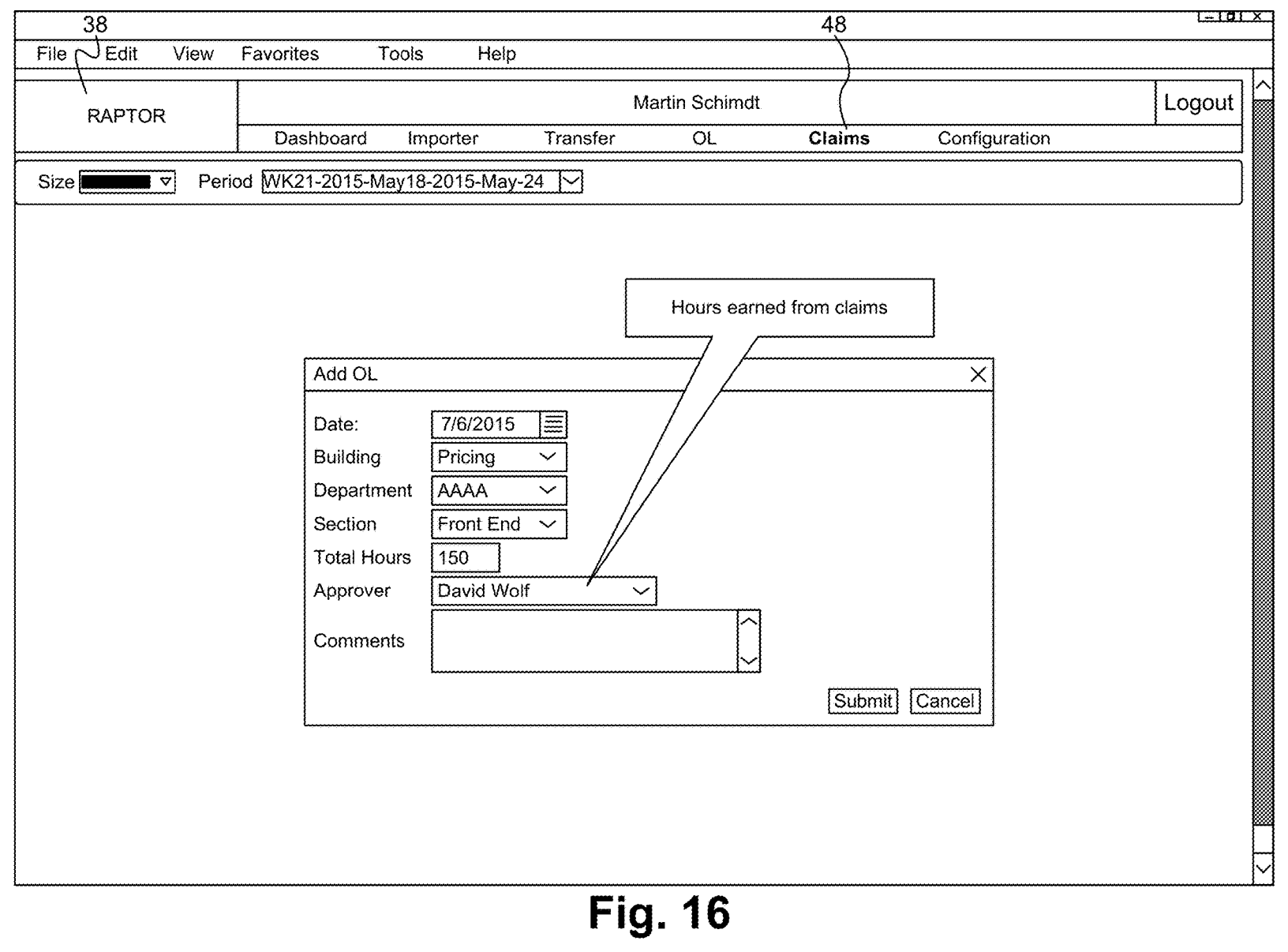

FIG. 16 illustrates a screen shot of an exemplary claims function used in the RAPTOR application according to some embodiments. The claims function is selected from the claims menu option 44 in the main menu 38. The claims function enables input of hours earned out of claims.

Figure 17:
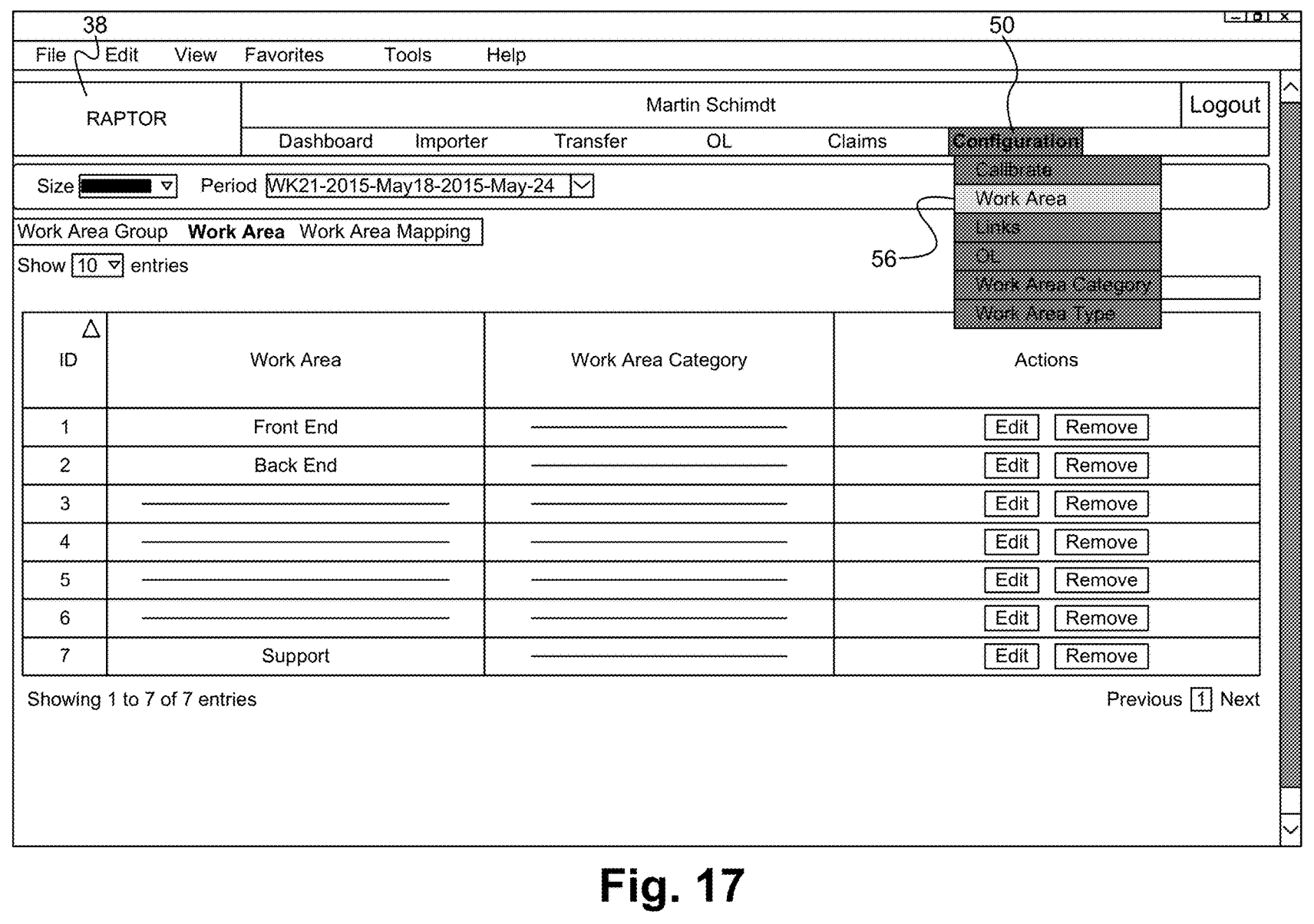

FIG. 17 illustrates a screen shot of an exemplary configuration function used in the RAPTOR application according to some embodiments. The configuration function is selected from the configuration menu option 50 in the main menu 38. The configuration function enables configuration of the system to maintain a master database. The configuration menu option 50 provides configuration by customer, work area, user, OL item, work area category or work area type. The screen shot shown in FIG. 17 shows an example of the configuration function as related to selection of work area menu option 56 from the configuration menu option 50.

Indirect Labor

Indirect labor headcounts are determined differently than direct labor headcounts. Direct labor requirements are calculated based on standard times, industrial engineering principles and demand. Indirect labor is still required even when not generating product, for example during the quotation stage and the process development stage. Additionally, certain work areas are not really dependent on how many products are being produced, for example the human resources (HR) department, the IT department and the research and development (R&D) department.

Figure 18:
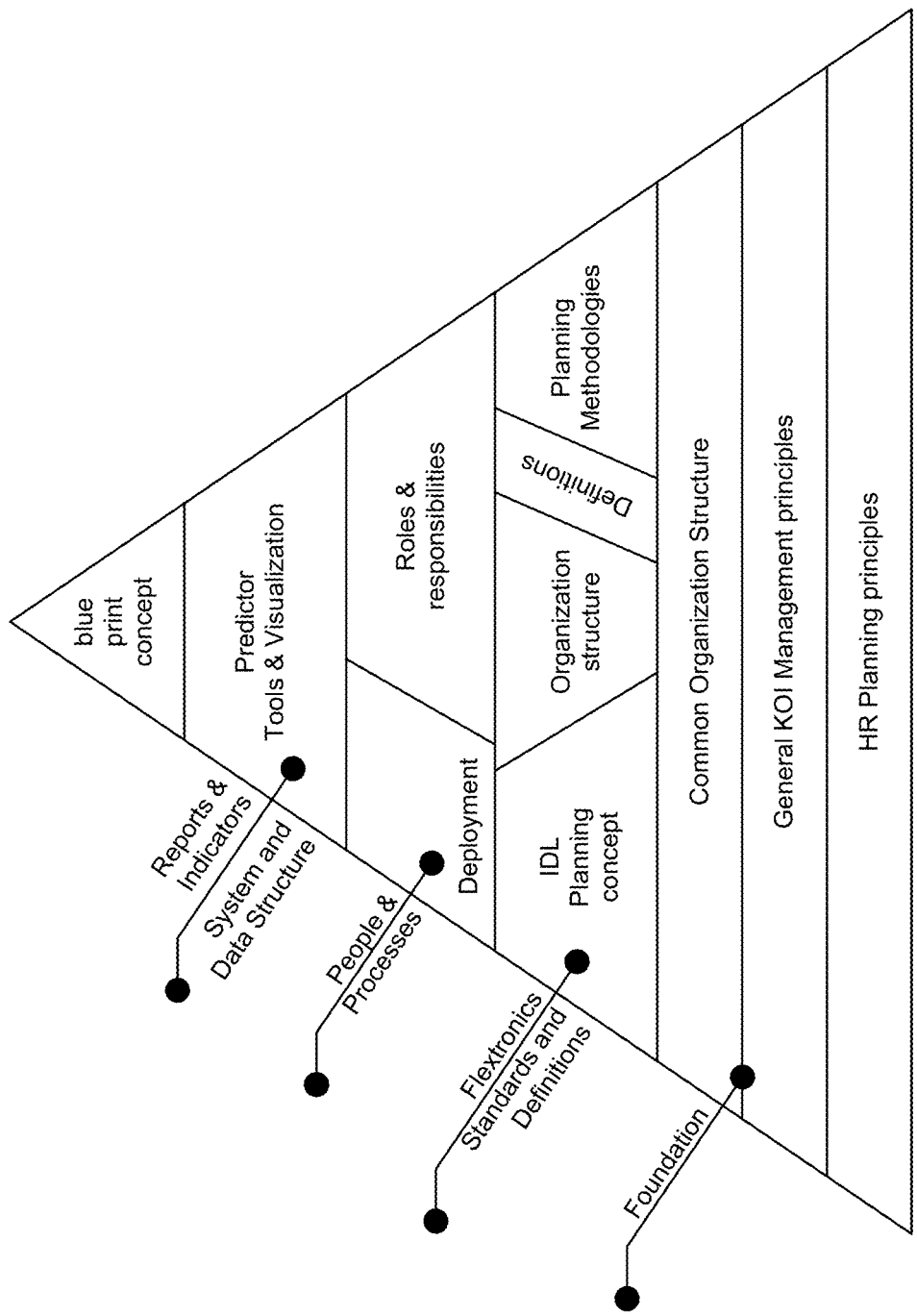
FIG. 18 illustrates a conceptual block diagram of standards and concepts used to achieve desired calculations and generate an indirect labor forecast.

FIG. 18 illustrates a conceptual block diagram of standards and concepts used to achieve desired calculations and generate an indirect labor forecast. The basic concepts behind indirect labor planning are based on HR planning principles combined with common KOI-Management activities and common organizational structure. On top of this layer, standards and definitions define how these principles are interpreted. Methods of implementations are in the people & processes section. A system and data structure is defined and reports and indicators are generated using the indirect labor tool, referred to as the Predictor tool. The Predicator tool is a corporate application to support these activities and provide one common toolset across all facilities. This enables getting the right number of qualified people into the right job at the right time.

A closer look at the important steps of the HR planning process is now discussed. In accordance with an organization's strategic plan, a first step in HR planning process is to assess the current labor capabilities of the organization. Questions to be answered include: How many employees are required to achieve the goals? What positions will need to be filled? What skills will the people need? A next step, when forecasting demand for indirect labor, one must address the multitude of external factors. To determine external impacts, consider the following: economic factors, technological shifts, cultural shifts, state of the labor market and demographics. Upon completion of the these steps, a gap analysis is performed. This includes, but is not limited to, identifying the number of employees and the skills required in the future and comparing them to the current situation.

The overall concept to calculate the headcount for indirect labor is based on the idea of establishing and defining activity drivers which are representative for the workload for one planning element. These activity drivers are referred to as parameters. A planning elements is a specific instantiation of a specific organization element and It is possible to define as many activity drivers per planning element as required, but anecdotal evidence has shown that usually one or two parameters per planning element are sufficient. If more than one parameter is selected, it is possible to weight the influence of the parameters to the workload.

Figures 19, 20:
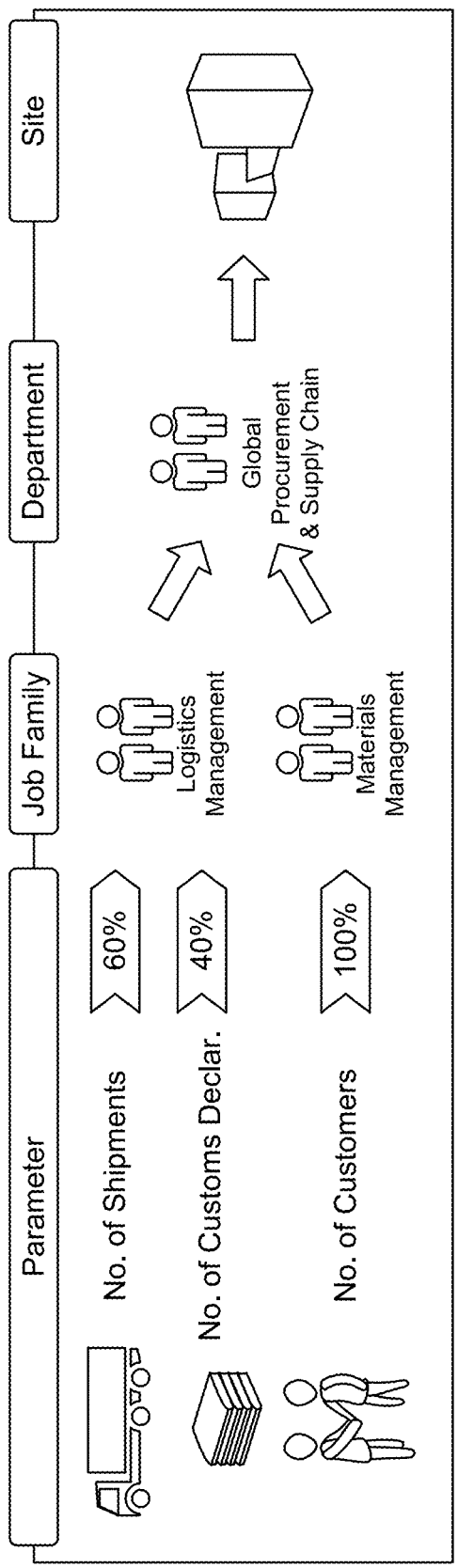
FIG. 19 illustrates an example describing the indirect labor concept.
FIG. 20 illustrates a chart showing an exemplary calculated headcount based on input parameter and factor values.

FIG. 19 illustrates an example describing the indirect labor concept. In the example shown in FIG. 19, the workload of an employee, working in logistics management, is depending on the number of shipments and on the number of customs declarations. This means the more shipments and/or customs declarations that need to be performed, the higher the workload and therefore the more people are required. If more than one parameter is driving the headcount, it can be defined which of the parameters has a higher influence on the workload. This is referred to as weighting the parameter. Based on historical information, a factor corresponding to the parameter can be calculated by how many shipments or customs declaration can be handled by one person within a given time period. When forecasting how many shipments and customs declarations are going to be performed in the future, the indirect labor tool can calculate how many people are required in this area. FIG. 20 illustrates a chart showing an exemplary calculated headcount based on input parameter and factor values. A factor value is a calculated value. Each parameter has an associated calculated factor value, and as such each parameter has associated with it a parameter value and a calculated factor value.

The calculated headcount is directly related to parameter(s) and not dependent on individual interpretation of the future business development. The values assigned to each of the parameters should reflect the future business development in the different areas and is therefore based on data and facts. The accuracy of the calculated headcount is dependent on the quality of the parameter's forecast. The value of a specific factor F is calculated according to equation (3):

$$F=P/(CHC-HCF) \qquad (3)$$

where P is the assigned parameter value, CHC is a current headcount, and HCF is a headcount fixed. Some portion of labor might not be variable, such as key positions for the company or department managers. The amount of these non-variable, or fixed, people will not vary based on workload. This is referred to as the HCF. The value for a specific headcount associated with multiple parameters, such as P1 and P2, where each parameter has a corresponding factor value, such as F1 and F2 calculated using equation (3), is calculated according to the equation (4):

$$HC=HCF+((P1/F1) \times W1+(P2/F2) \times W2) \qquad (4)$$

where W is the weight given to each parameter.

Levels of granularity are now described. Every employee is mapped to one job profile. Job profiles are grouped into job families and they are clustered into groups. Selecting the right level of planning helps to keep the administration effort to an acceptable level while providing the required level of accuracy. Therefore, it is possible to plan on any and all levels of granularity. The different levels are: site level, department level, job family level and job profile level. The level of granularity can be chosen depending on the number of people and similarity of work in one department. Job title level planning requires a higher monthly effort than department level planning because each job title's set of parameters have to be defined and maintained. A proper selection of the granularity level based on parameter tracking provides detailed headcount planning information and keeps the planning effort to a minimum.

By reviewing the process monthly, the forecast of people over the succeeding month or months becomes visible and easier to plan for or react early to if adaptations to the headcount are required, for example the lead time to hire people changes. There is no limitation on frequency of process utilization, recommendation is on monthly base.

Headcount can be planned according to two main approaches: a top down approach and a bottom up approach. In the top down approach, a set of parameters is used to calculate the total site headcount. The split of headcount into the different departments or job families is then done based on the actual headcount in the site. This approach provides a fast way to calculate estimated headcount for the whole site without planning every department. Within this top down approach, the workload through the whole site is essentially averaged. The headcount for a single department might not always be accurate. This method provides an indication of how the headcount is developing, for example is the headcount increasing or decreasing in a specific department.

In the bottom up approach, planning is done on the lowest required granularity level, for example department, job family or job title. For each planning entity (department, job family or job title), a set of parameters and factors are defined, parameter values are assigned, factor values are calculated, and the headcount of the different planning entities are calculated are rolled up into the final site headcount. The effort to plan the site headcount with this approach is higher, but provides an accurate result.

It is common to have people managed in one department but performing the day to day activities in different departments. This is referred to as shared resources. Examples of sharing resources are campus organizations when there are departments supporting the whole campus (e.g. IT, HR), long term project organizations where the project team includes people from different departments, and centralized functions where activities are performed in a defined single location or group, such as shared services centers. To be able to map such shared resource requirements, an additional field called "secondary organization" is used. In some embodiments, one employee is assigned to exactly one primary organization, but can also be linked to multiple secondary organizations. The manager of the primary organization decides how many people are required to perform the workload and how many people that are allowed to be shared out to different departments. Additionally, the manager defines the parameters used to plan the headcount for his department, the primary organization. As a people designated as shared resources performs their work content for a different department, that person is counted as an additional headcount for the secondary organization.

Figure 21:
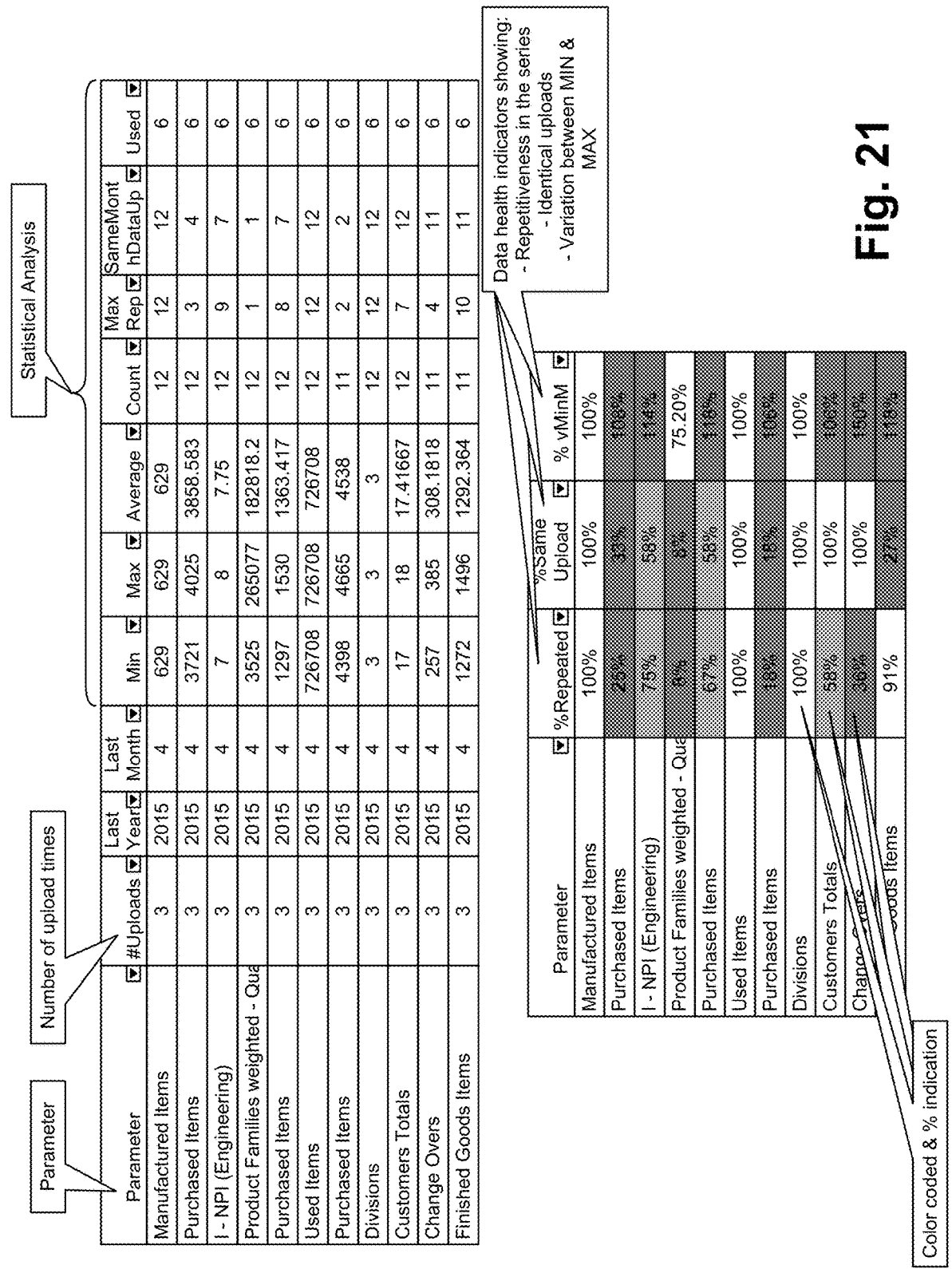
FIG. 21 illustrates an exemplary parameter quality screen.

As the calculated headcount is directly related to parameters and their values it is mandatory to keep a special focus on which parameters are selected to perform this exercise. If the parameter values are not reflecting the real workload, or are not maintained and forecasted properly, the calculated headcount will not meet the reality. As such, the better the parameter values are forecasted, the better the headcount planning will be. FIG. 21 illustrates an exemplary parameter quality screen. The parameter screen shows how well the different parameter forecast values are maintained. For example, if the forecast value for the number of produced units does not change from forecasting period to period, this most likely indicates that not much effort was made to accurately forecast that value. The chart in FIG. 21 shows by percentages how well each parameter forecast is being maintained. The lower the percentage the better the parameter forecast is considered maintained. A parameter which is usually well suited to be a base for planning meets the following conditions: the parameter has a direct relation to the workload in this area, the parameter is received out of an IT system (globally or locally), the parameter can be forecasted or contains future values (12 month), the parameter contains the actual values for historical periods, and the parameter has a certain agility (0%<x<200%). The selected parameters and their factors can vary from site to site, even if the activities in the different sites are very similar. As the organization structures in the different sites are not the same, the detailed work content is slightly different as well.

Figure 22:
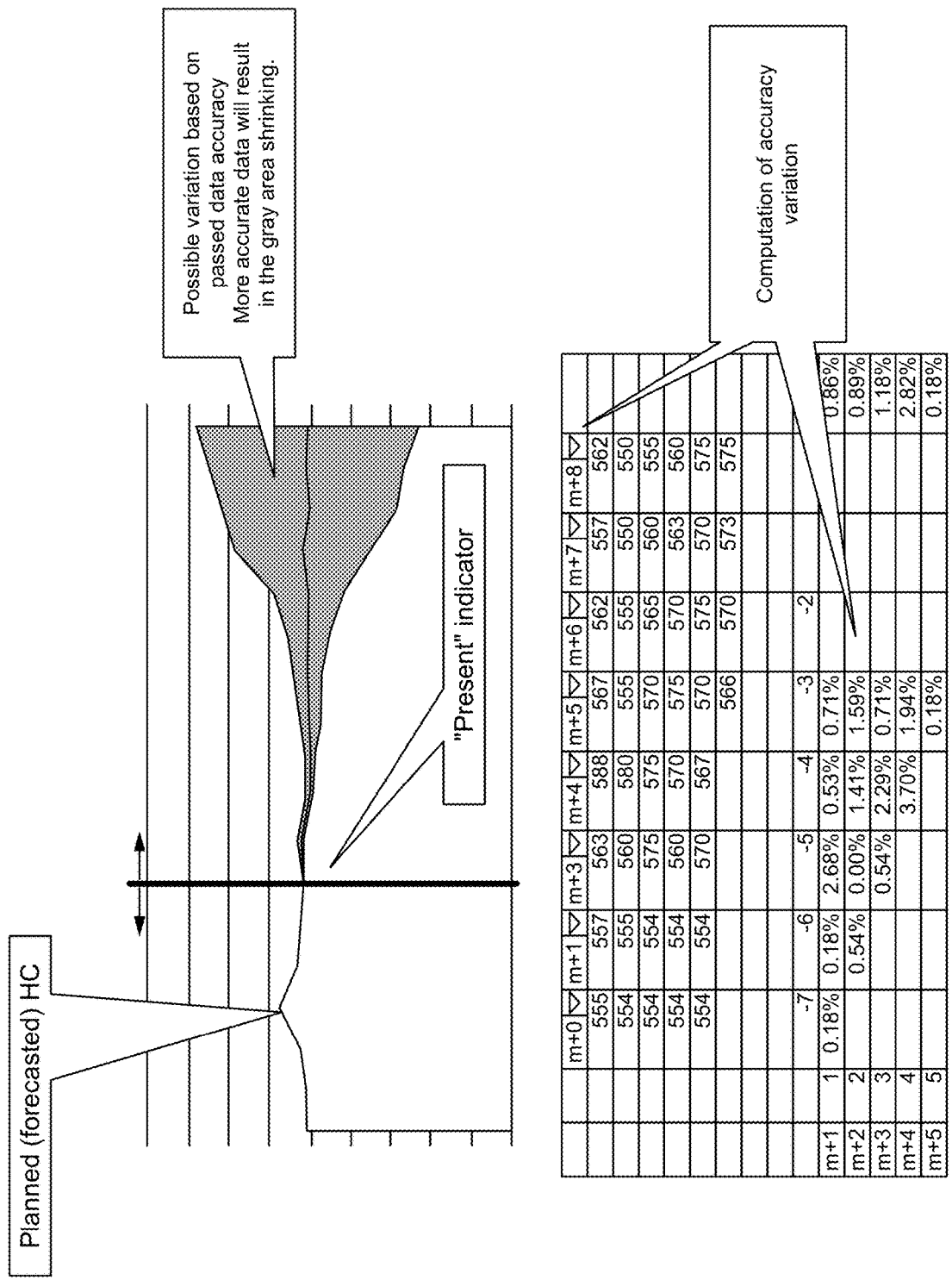
FIG. 22 illustrates an exemplary parameter accuracy screen with headcount potential deviations based on error rate associated with parameter accuracy.

FIG. 22 illustrates an exemplary parameter accuracy screen with headcount potential deviations based on error rate associated with parameter accuracy. The upper portion shown in FIG. 22 shows potential variation in data accuracy. The table below shows the potential error rate for the forecast based on how far in the future the forecast is for.

Forecasting KOIs or parameters is usually the biggest challenge in this exercise. In many cases a parameter is driving the headcount in one department but cannot be forecasted. If this is the case, it is possible to find another parameter which is driving the original parameter. Example: The travel agency department is mainly driven by the number of travels. This means the more travels the department need to arrange, the more people are required. It is difficult to estimate how many travels the agency need to perform in 8 months from now.

There are 2 different scenarios possible. First, calculate the number of travels for each month in the future based on historical information. Different calculation methods can be used from a simple average calculation up to a sophisticated analytical approach considering seasons etc. This approach is usually applicable if there is no major change in portfolio or business strategy. Second, find another parameter(s) which drives the number of travels. Usually the more indirect labor there is on site, the more travels are required or the more customers the site serves, the more customer visits and therefore travels are most likely to happen.

There are a number of aspects that increase the complexity of forecasting a parameter. First, parameter values maintained outside of an IT system (e.g. in Excel®). These parameter values are usually reflecting the personal view of future business developments. The quality of the data is very much depending on the person who is maintaining this data source. Data could be adjusted based on personal interests. Second, the degree to which a parameter is weighted. A parameter needs a weight if one parameter leads to very different workload for an employee in this work area. For example, if the number of customers is used as an indicator and customer A results in very high workload and customer B in very little. Third, parameters which are reflecting a future state which is not predictable. For example, number of sales wins in 8 months from now, etc.

Figure 23:
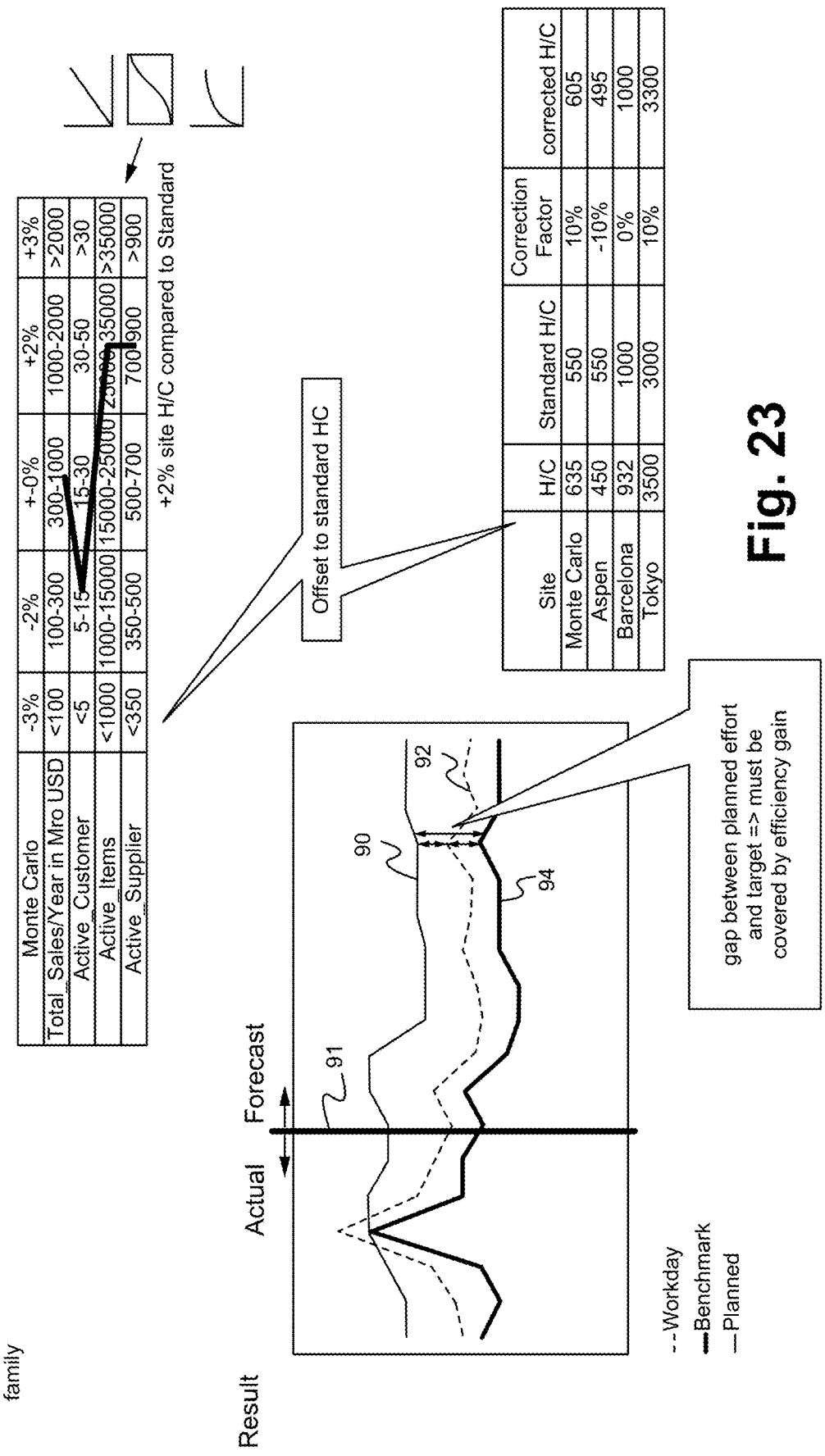
FIG. 23 illustrates an exemplary benchmark screen performed at a site level.

A benchmark process uses a benchmark set at the corporate or site level and serves as a goal and a reference. FIG. 23 illustrates an exemplary benchmark screen performed at a site level. Curve 94 represents the benchmark headcount. Curve 92 represents the actual headcount on site until time T, which is represented by vertical line 91. After time T is a projection based on needs, abilities (financial and availability of labor). A forecast is determined by HR and site management for 12 months in advance, for example. Curve 90 represents the planned headcount, which uses preset parameters set by HR and site management to represent the optimal number of indirect labor required to the set department. Arrows show the difference between sites forecasted benchmark, planned and actual headcounts. Ideally after the site starts using the indirect labor tool the accuracy of the forecasting can be monitored and in time should be aligned with the planned headcount curve. The closer actual and planned headcount lines are the better the parameters are reflecting the reality of the headcount. Furthermore, there should be a tendency to have the actual and planned headcount aligned as this leads to maximum efficiency and it shows that hiring is done based on work requirements. Benchmarking should be setting new standards for the site and force the increase in efficiency, and reevaluation of parameters. The gap between benchmarking and actual headcount is representing the difference between ways of work, work environment and efficiency. The gap between the benchmark and planned headcount represents alignment between corporate requirements and site needs based on future plans.

Figure 24:
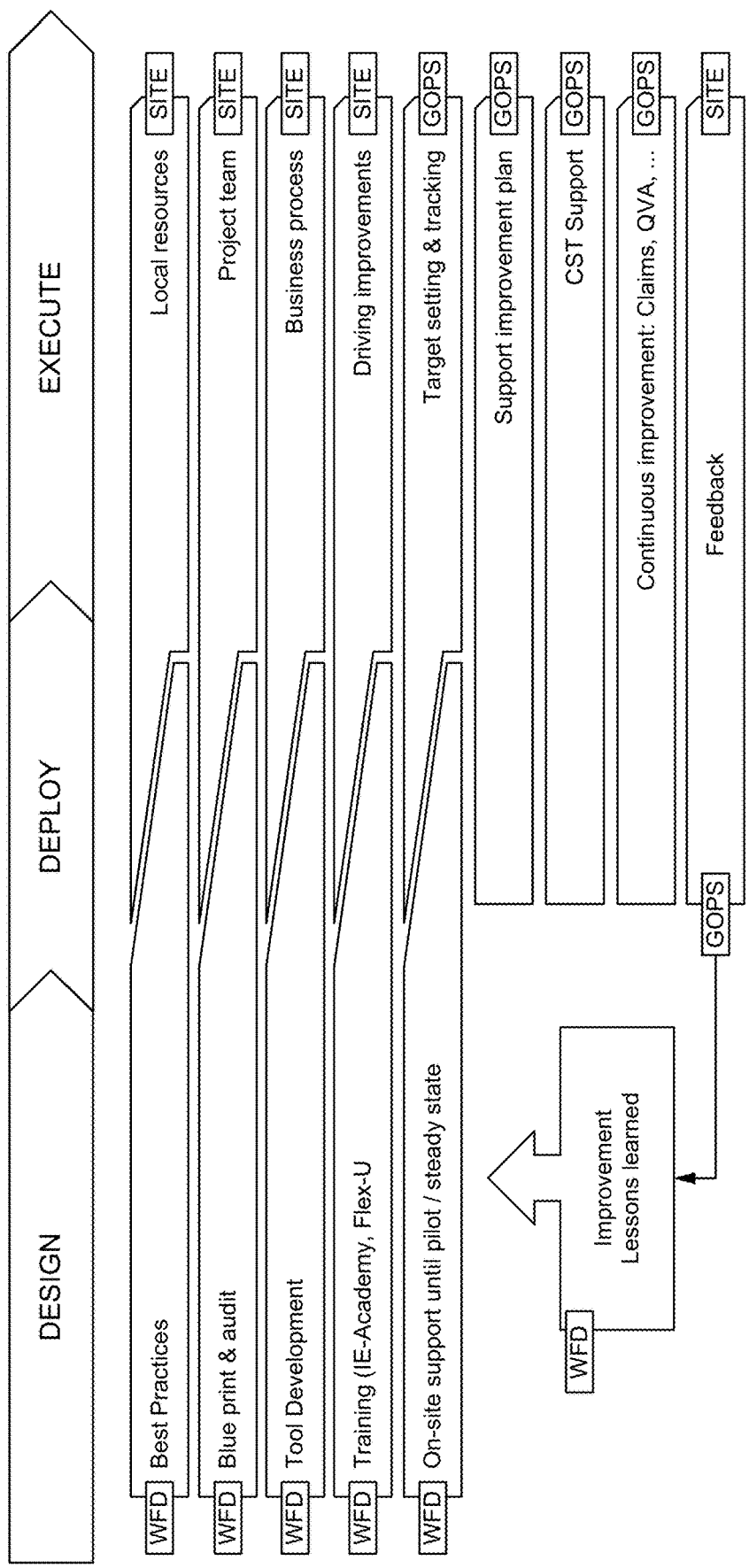
FIG. 24 illustrates a graphic representation of an exemplary split of responsibilities between site, global operations (GOPS) and workforce design (WFD).

Responsibilities between site, global operations and workforce design can be shown graphically. FIG. 24 illustrates a graphic representation of an exemplary split of responsibilities between site, global operations (GOPS) and workforce design (WFD). Furthermore, three major activities can be identified: design, deployment and execution. The design portion is handled by WFD and is based on the goals of the project and the inputs coming from the sites. Deployment of the indirect labor tool and process is handled by joint efforts of WFD and the site on which it is being deployed. WFD helps to identify the right parameters and can provide information on how other sites are setting up their environments. The site management team can use the indirect labor tool and process on a monthly base to plan their headcount for the future and take actions when required. Global operations set global targets and review the results with the sites. A close communication between WFD, site management and global operations is helping to identify potential improvement areas for the indirect labor tool and process.

Figure 25:
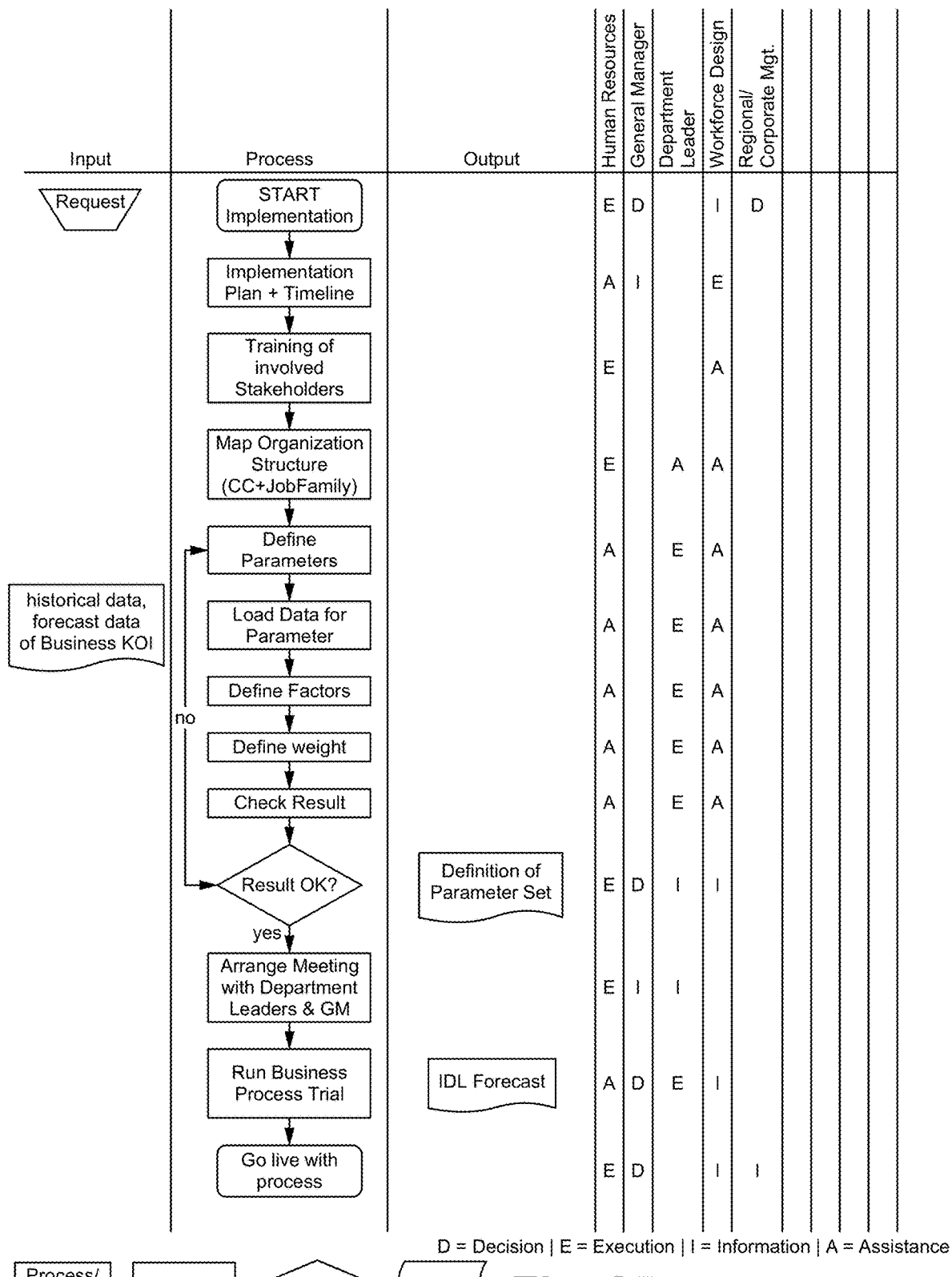
FIG. 25 illustrates an exemplary indirect labor force management implementation process flow.

FIG. 25 illustrates an exemplary indirect labor force management implementation process flow. Responsibility is to coordinate with regional/corporate management at the site to determine readiness of the program. General Managers (GMs) also provide assistance and support if and when needed to HR, the implementation team and the WFD team. Department leads provide assistance to HR during mapping of the organization by providing valuable input and checking the validity of information at hand. During the implementation itself, department leads provide quantifiable, parameters that are used to forecast workload ether on department level or job family level within the department. Moreover, department leads provide data for all and any parameters possible on periodic basis and forecast, for example a monthly basis as a twelve-month forecast, especially if information comes from their department. WFD informs the site that implementation process is to begin and prepares and distributes the plan for the site. Additionally, WFD provides assistance during the training process and implementation process. WFD also helps department leads identify parameters that best represent the workload that drives the headcount. Furthermore, WFD inspects and insures that the results are accurate. Upon the completion of the implementation, WFD presents the results to all of the parties involved in the process and provides further support and assistance when needed. Regional/corporate management is in charge of initiating the implementation on sites by making a decision to include the site in the program. Additionally, regional/corporate management should receive and review information from the site on its progress, results, and decisions.

Figure 26:
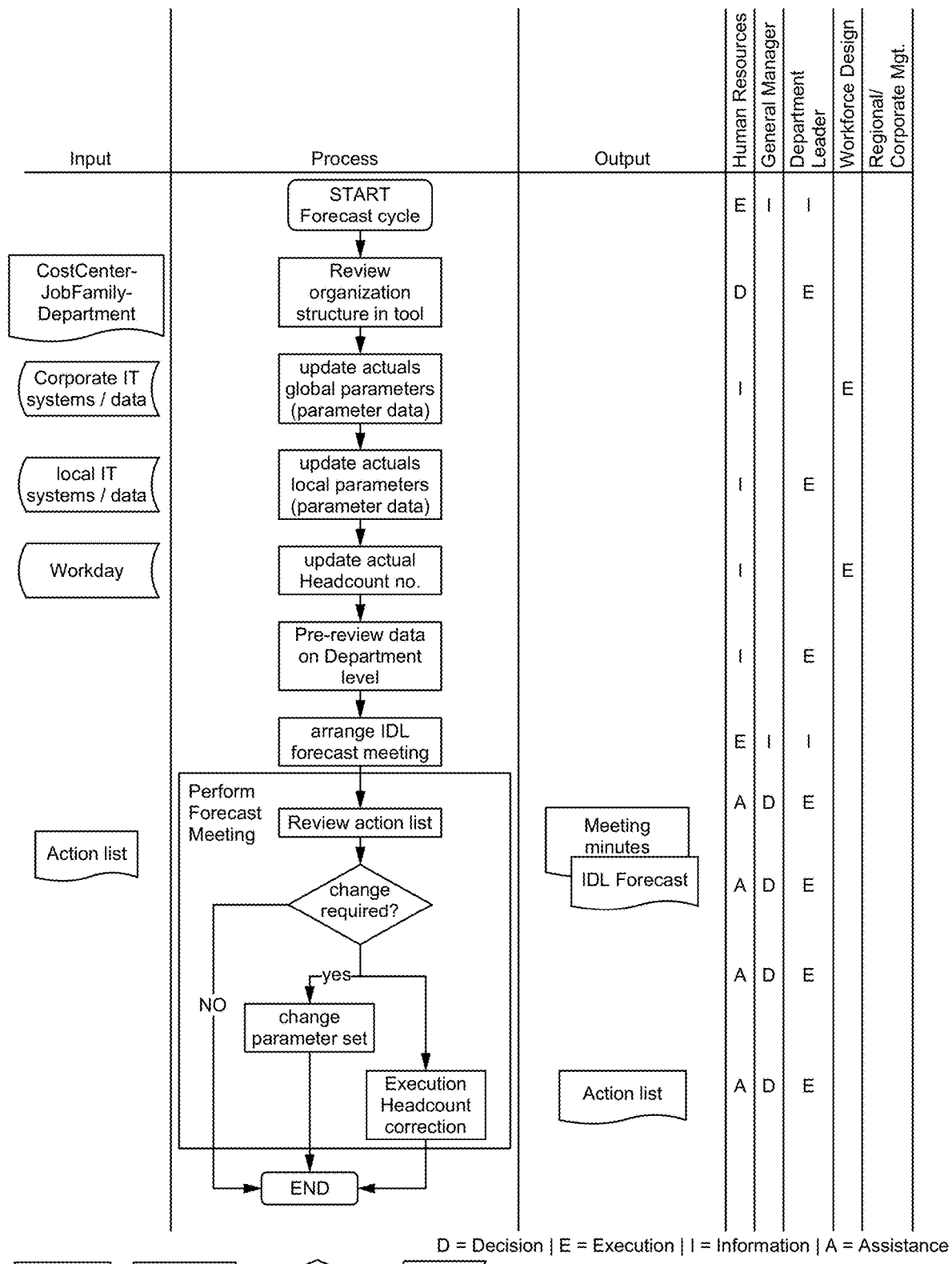
FIG. 26 illustrates an exemplary indirect labor force management forecast process flow.

FIG. 26 illustrates an exemplary indirect labor force management forecast process flow. In the forecast process, the role of HR is extensive. HR is responsible for initiating the forecast cycle and scheduling the forecast meeting. Prior to the meeting, the HR department reviews and amends the organization structure. Furthermore, the role extends to providing data for parameters into the indirect labor tool and reviewing data, making sure it is correct. During the meeting, HR is to provide assistance if needed to the management team. Upon completion of the monthly, for example, process, HR compiles a report and informs WFD about any changes and decisions. The GM has to inform HR when they intend to start the planning process for the month. Additionally, GMs are required to make decisions in the management meeting based on need, financial ability, and quotes set by their superiors. Department leaders are responsible for providing parameter data to HR who updates the information in the indirect labor tool. Additionally, department leaders are responsible for executing decisions made by the GM in the forecast meeting. WFD is in charge of updating headcount from the actual headcount database, for example Workday®, into the indirect labor tool and providing support to the sites on the aforementioned process in case there are any issues.

Figure 27:
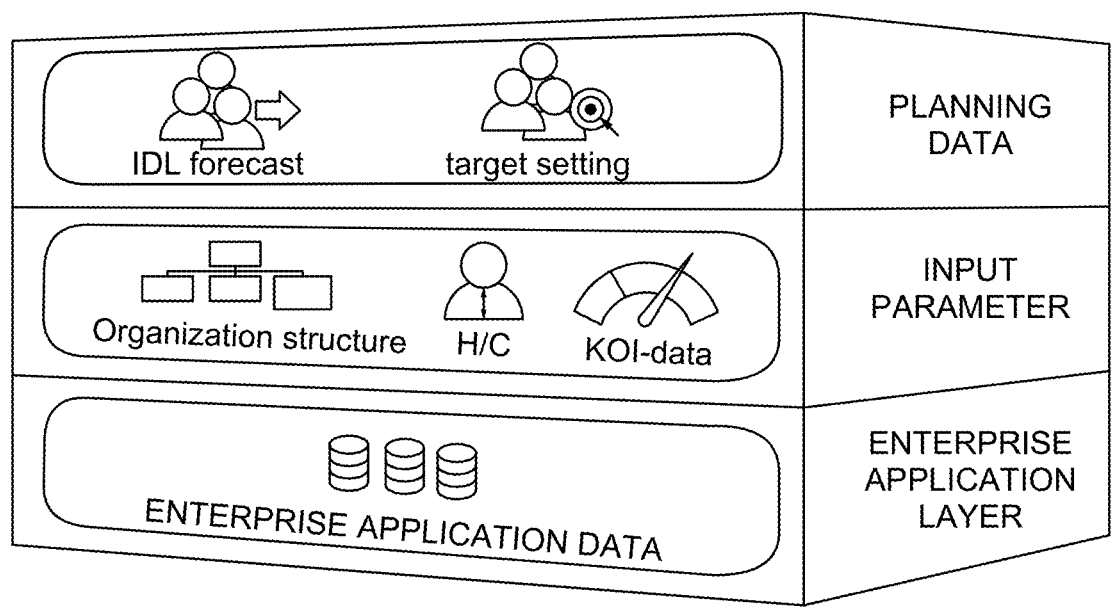
FIG. 27 an exemplary protocol stack for implementing various aspects of the indirect labor tool.

The indirect planning tool, referred to as Predictor, can be accessed through a web browser. Predictor is used to configure the parameter setup used by the different organizations and provides visualizations of the actual and calculated headcounts. FIG. 27 an exemplary protocol stack for implementing various aspects of the indirect labor tool.

Figure 28:
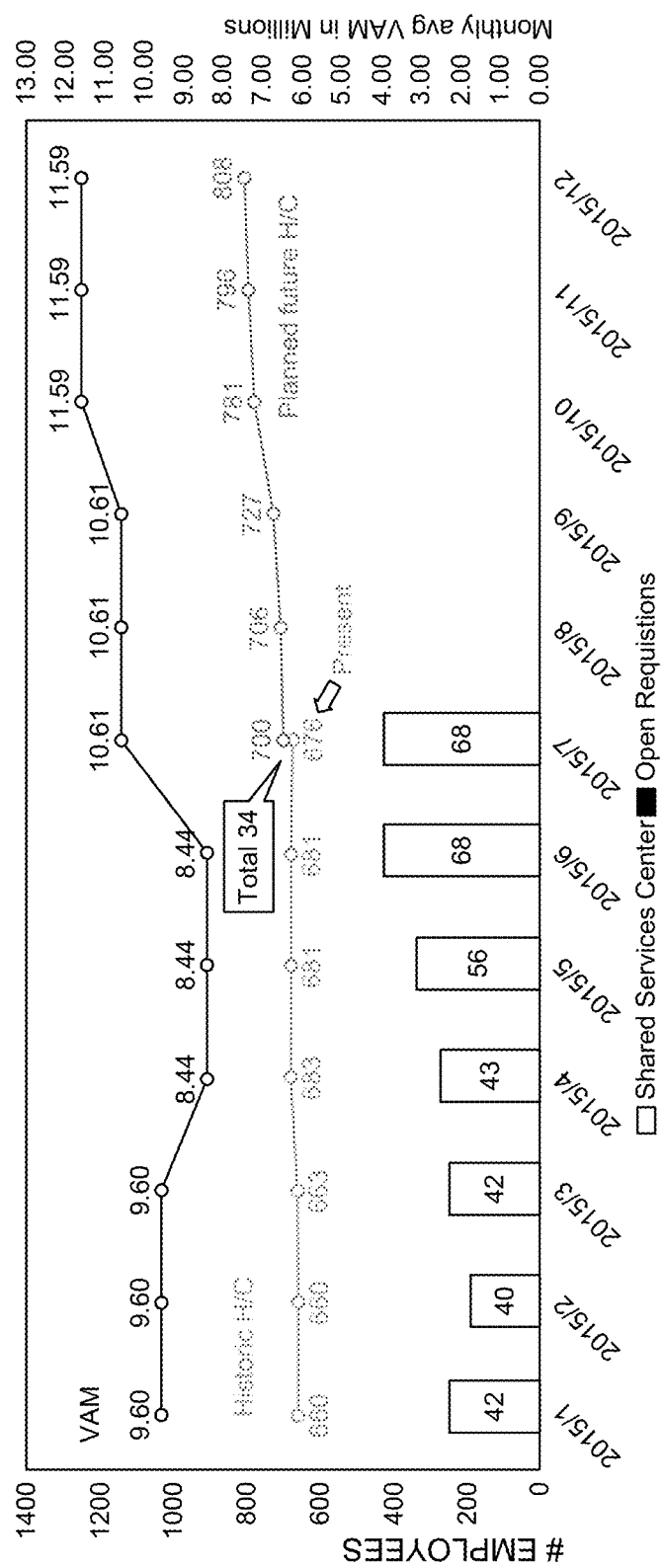
FIG. 28 illustrates an exemplary total site headcount overview management report.

The indirect labor tool generates multiple different management reports that provide visual representations of the actual and forecast headcount information. The graphical nature of these reports provides a powerful medium for synthesizing and conveying complex data in a simplified and understandable format. FIG. 28 illustrates an exemplary total site headcount overview management report. This report is used to provide an overview of the current month and can be coupled with any parameter/driver used on site. It is understood that time periods other than monthly can be used. In this specific case, an averaged quarterly VAM (Value Added Margin) is shown. The reason for having the headcount and the financial indicator VAM is to graphically depict the relation between the trends of headcount on site and state of business. In the case of any misalignment between the two, further discussions are required to find out the root cause. Additionally, a number of shared services center support is represented on the bottom of the screen. Shared services center headcount is taken from the shared services center internal customer type field in Workday®.

Figure 29:
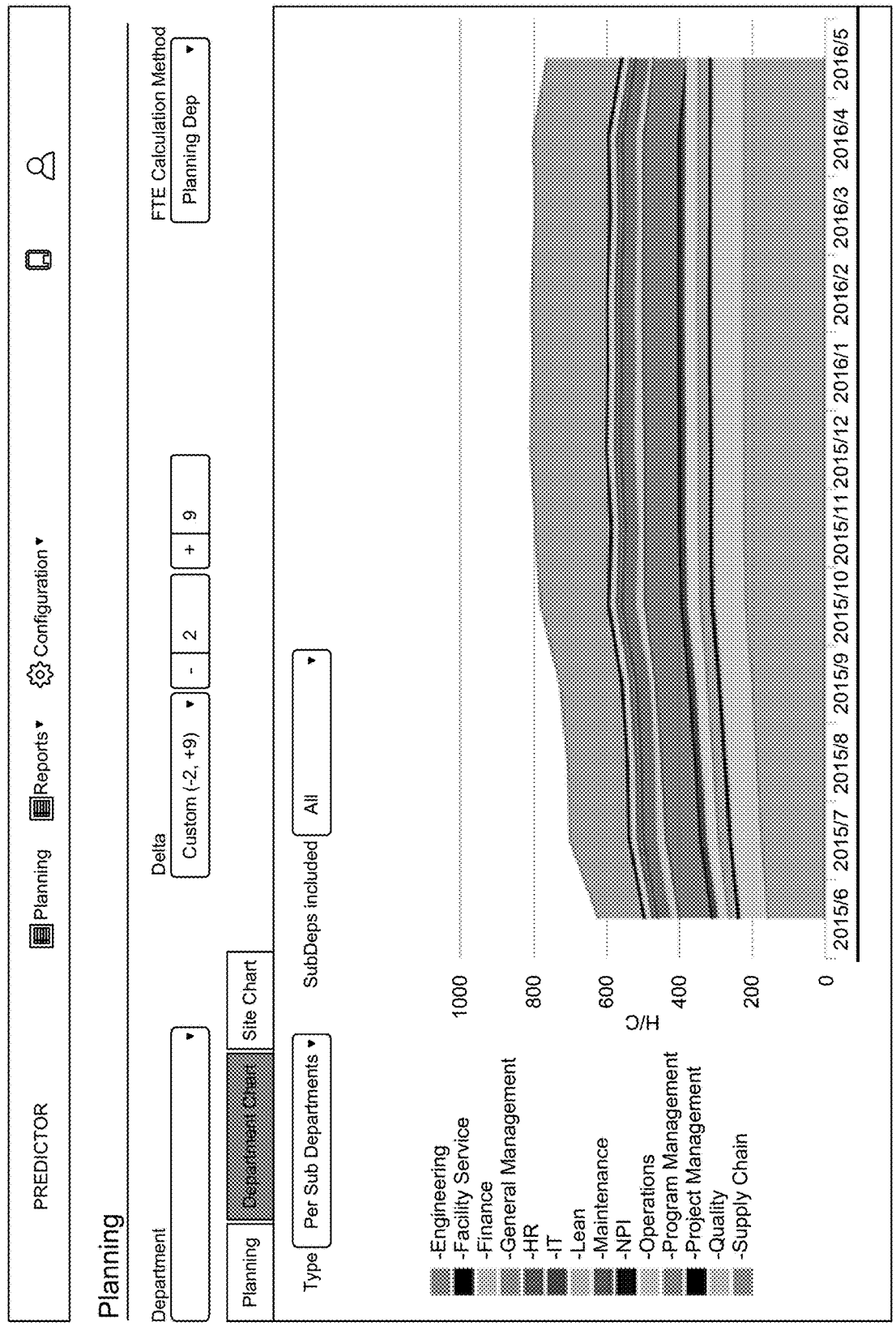
FIG. 29 illustrates an exemplary sub-department management report.

FIG. 29 illustrates an exemplary sub-department management report. The sub-department management report is used as an overview to see how the headcount is developing over time split by the departments. It is useful to see if the headcount based on workload is shifting from one department to others so potential job rotations can be evaluated. Such shifts may happen, for example, if a lot of NPI (New Product Introduction) projects are entering the mass production stage. NPI is a maturity phase as related to product from a production standpoint, this is the phase before mass production. This phase generates little to no revenue for the site and does not guarantee that the product will go to mass production.

Figure 30:
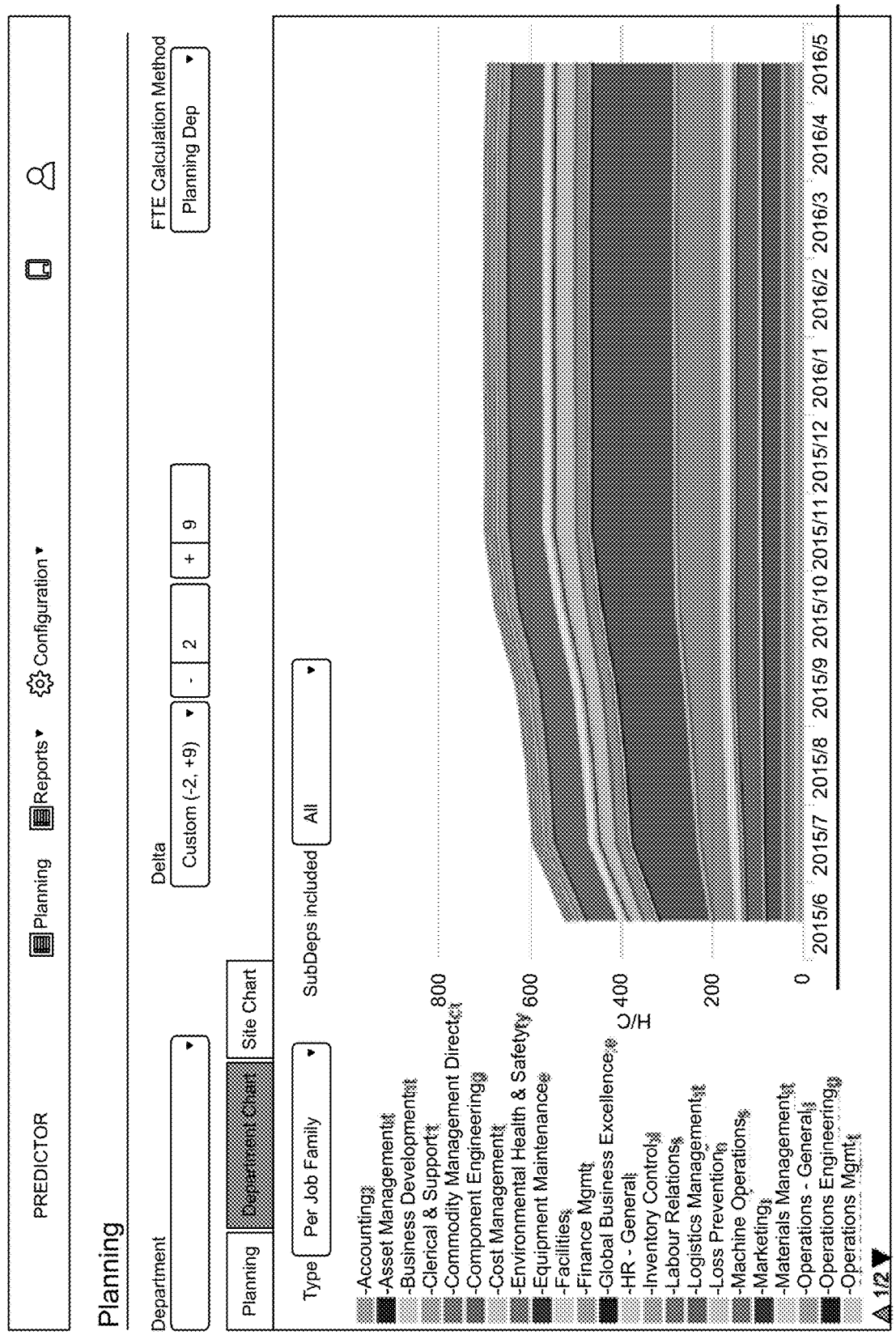
FIG. 30 illustrates an exemplary job family management report.

FIG. 30 illustrates an exemplary job family management report. In the job family management report, a split of headcount based on job family can be seen. Due to the organizational setup of a site, it can happen that people are performing similar activities but are working in different departments, for example value stream setup or NPI vs mass production. Therefore, it is valuable to show how many people in total are performing similar activities.

Figure 31:
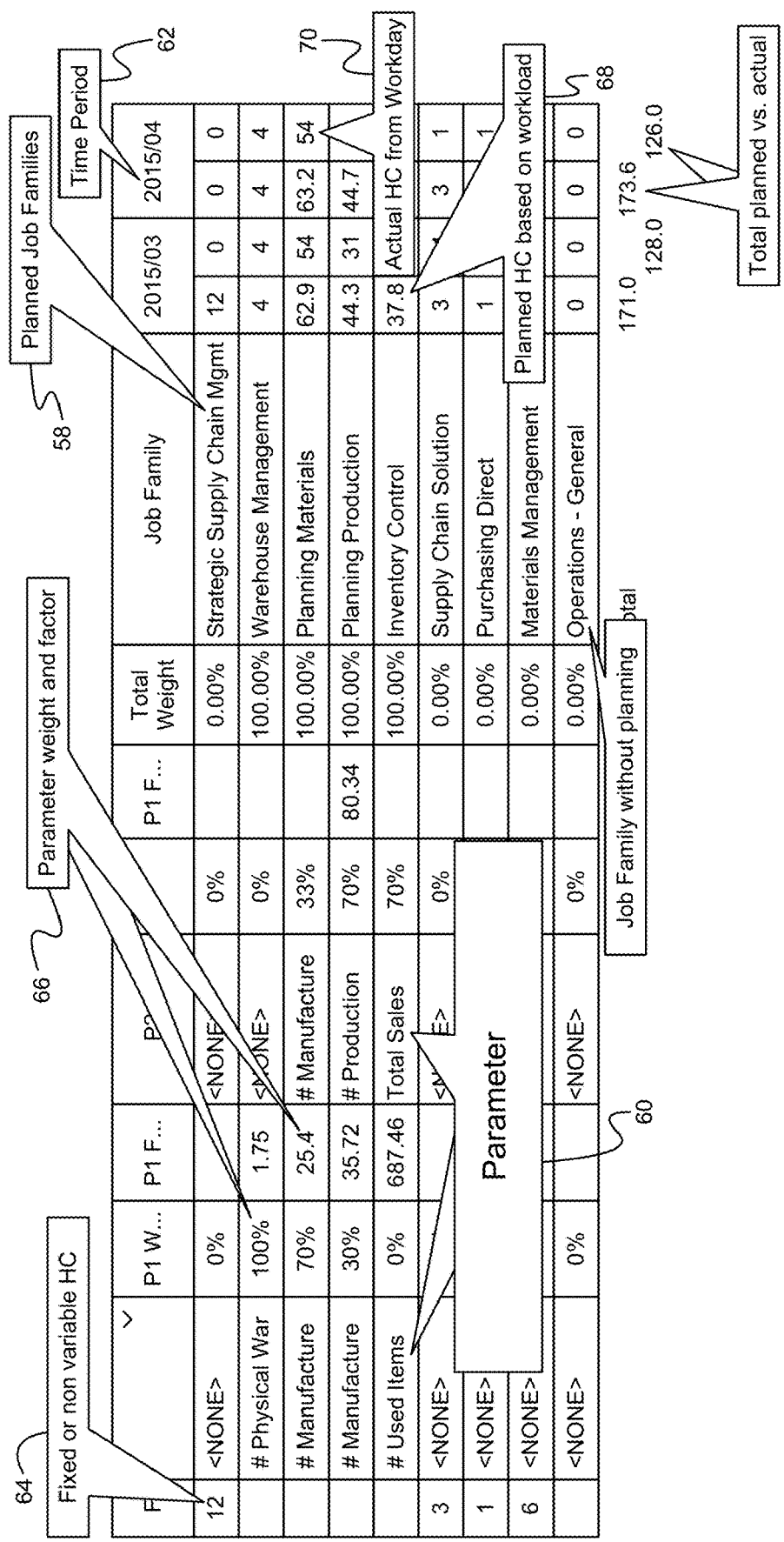
FIG. 31 illustrates an exemplary bottoms up headcount and planning set up for a specific project according to some embodiments.

FIG. 31 illustrates an exemplary bottom up headcount and planning set up for a specific project according to some embodiments. The job families 58 are listed as are the defined parameters 60 which are driving the headcount for each job family. The time period 62 for the calculated headcounts is shown. Fixed or non-variable HC 64 refers to the number of people that are always required, independent of the workload or any parameter. The weight and factor of each parameter is shown as parameter weight and factor 66. The calculated planned headcount (HC) 68 for each job family is calculated by the system. The actual headcount 70 is populated from a time and attendance database imported from the enterprise application layer. By comparing the planned headcount with the actual headcount gaps can be identified which indicates what job families have too many or too few people. The planning concept, for example the planned HC versus actual headcount, is dependent on the granularity level chosen. The HC can be seen at a job family level, department level or even site level. Charts can also be provided that show trends in headcount over time. Such charts can show headcount by department, job family or site location.

Every person in the company has been assigned to a specific job profile and job family. People in the same job family may or may not be working in the same department. For example, if there are people that are doing purchasing of components, there may be people that are purchasing components for the mass production (which requires a high volume) and there may be different people that are purchasing components for new products (not yet in running production). This latter group is buying in lower volume than the former group, and most likely purchasing from a different supplier. Although the general activity (job family) is similar, e.g. purchasing components, these people might be in different departments. In general, one job profile is associated with one job family, but not vice-versa, and one job family can be associated with multiple different departments or other organizational elements. As such there may be varying degrees of overlap and correlation between designated job families and departments. Therefore the workforce design method and tool enables planning based on the department, job family and/or job profile.

Figure 32:
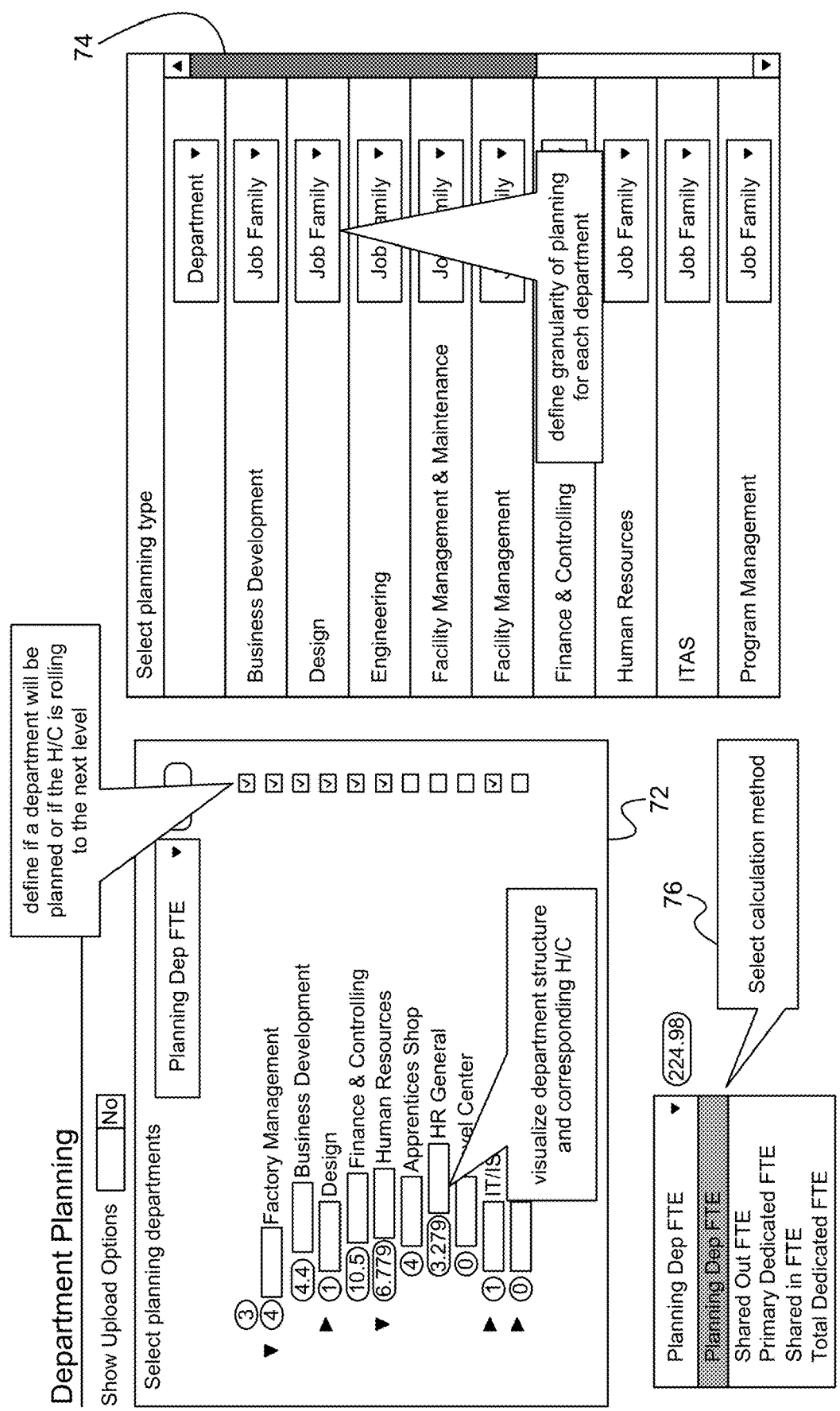
FIG. 32 illustrates an exemplary department planning screen for a specific project according to some embodiments.

FIG. 32 illustrates an exemplary department planning screen for a specific project. The left side box 72 enables selection of the department structure by selecting which departments and sub-departments are to be used for the specific project. The headcount for each selected department and sub-department is calculated by the system. The granularity of each department is selected using the right side box 74. In this case, each department/sub-department selected in the left box 72 is shown in the right box 74, and for each department/sub-department a job family is selected. One Job Family can exist in multiple departments, and one department can contain multiple job families. Each person is assigned to one job family and one department. That job families that are visible for one department depends on the people who are working in this department.

People in one department can support other departments. The select calculation method box 76 enables different headcount calculations to be made based on people planned strictly for a single department, people shared with other departments, or people borrowed from other departments.

The planning tool shown in FIG. 32 is shown in regard to department planning. It is understood that a similar such tool can be used as a job family planning tool.

FIG. 33 illustrates an exemplary parameter planning and data management screen for a specific project. The parameter planning tool enables inputting of forecasted parameter values for various time periods. In this example, the parameters include # of invoices, # of customers, # of manufactured items, # of NPI (New Product Introduction) customers, # of suppliers, etc. NPI customers are customers introducing a new product to the manufacturer as compared to regular customers that already have product running in production. As soon as a product enters mass production a customer transforms from NPI to regular. The input forecasted parameter values are later compared to actual parameter values.

FIG. 34 illustrates an exemplary headcount screen. The headcount screen shows actual headcount view and management screen along with work area allocation abilities, and report generating abilities.

Figure 35:
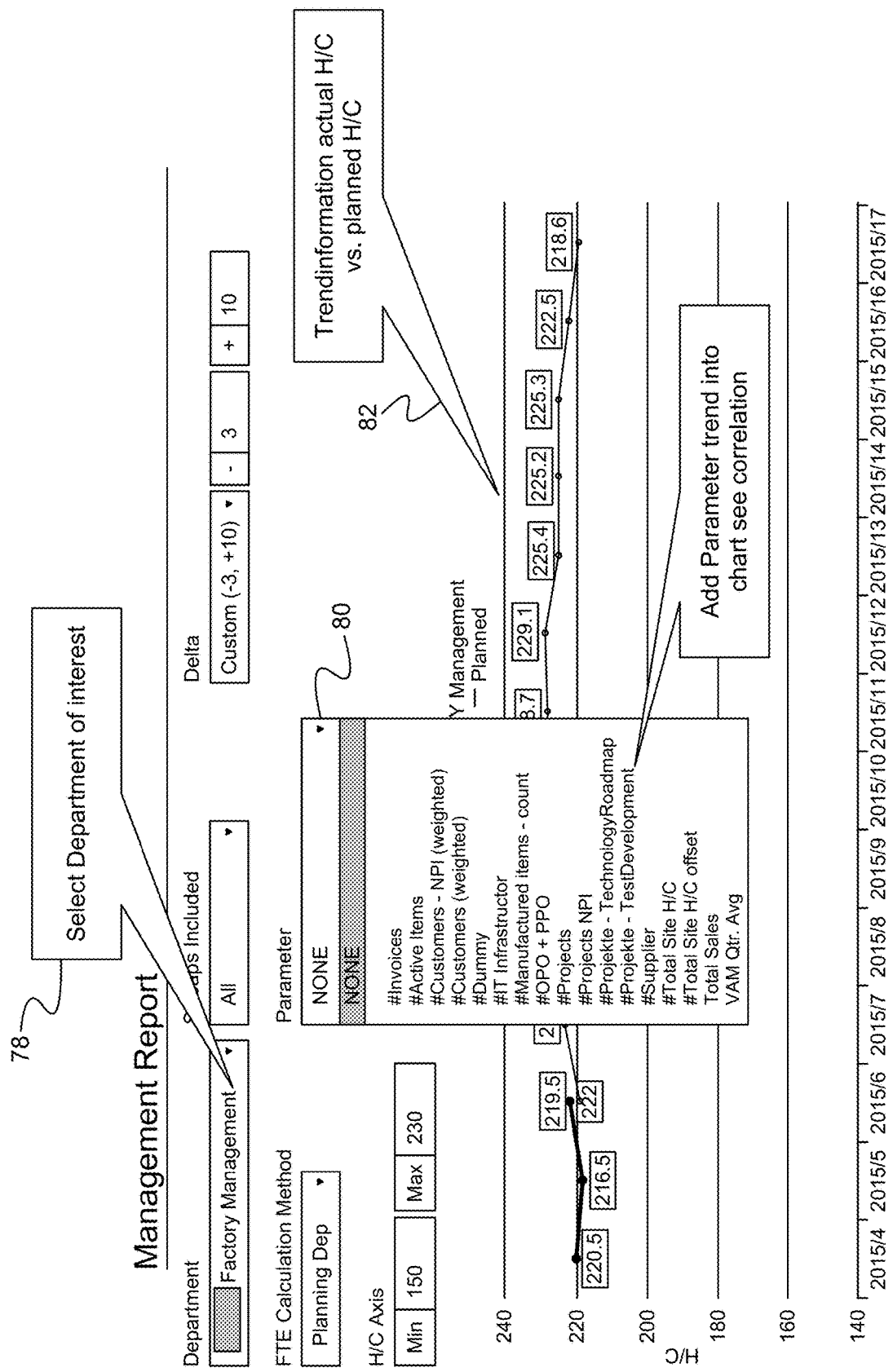
FIG. 35 illustrates an exemplary management report screen for a specific project according to some embodiments.

FIG. 35 illustrates an exemplary management report screen for a specific project. The management report can define any level in the department structure 78, and then any parameter 80 within the selected department to compare the forecasted parameter values to the actual parameter values for the selected parameter over time, such as graph 82. In the example shown in FIG. 35, activity is shown on a monthly basis because for indirect labor the lead time to fill staffing requirements is much longer than for direct labor, which typically shows weekly activity. It is understood that any time period can be used.

The workforce design method and tool enables generation of forecasted headcounts for a specific project, and comparison of those forecasted headcounts to actual headcounts eventually used. Comparing each of these headcounts for a given month shows the real gaps between actual headcounts and the forecasted headcounts. This provides data for the sites to act on in order to gain more efficiency by automating, outsourcing or other means to achieve matching headcounts.

The present application has been described in terms of specific embodiments incorporating details to facilitate the understanding of the principles of construction and operation of the workforce design method and tool. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A system for determining headcount for a project and providing a visual representation of the project headcount, the system comprising:

a. a database server containing data for an objective of the project, data for a manufacturing process flow structure having multiple defined steps for completing the project, data for direct labor activities and associated standard times for each direct labor activity, and data for an organizational hierarchical structure;

b. an application and presentation system including a processor and a visualization tool, the visualization tool having a plurality of graphical user interface (GUI) tools, wherein a first set of GUI tools is configured for defining the manufacturing process flow structure and the organizational hierarchical structure, as entered by a user via the first set of GUI tools, wherein the manufacturing process flow structure defines, as entered by the user via the first set of GUI tools, an interconnected sequence of a plurality of direct labor activities arranged as a defined routing path through a manufacturing facility to be performed to meet the project objective and defines, as entered by the user via the first set of GUI tools, a plurality of organizational elements wherein each organizational element is to perform one or more of the plurality of direct labor activities, further wherein the organizational hierarchical structure defines the organizational hierarchical structure of an organization tasked with completing the project and includes a listing of employees, each employee is associated with an employee-specific job profile, as entered by the user via the first set of GUI tools, that defines direct labor skill functions and responsibilities of the employee, wherein the processor, via programmed instructions, is configured to determine the direct labor skill functions to complete the project using the manufacturing process, to calculate a number of direct labor employees to perform the one or more direct labor activities in each organizational element used to perform the direct labor activities corresponding to the manufacturing process, wherein the number of direct labor employees is calculated according to standard times for each of the direct labor activities imported from the database server, to sum the calculated number of direct labor employees for each organizational element in the organization hierarchical structure used in the manufacturing process to determine a total number of direct labor employees for the manufacturing process and the project, to display a summed headcount for each organizational element, a summed headcount for each successive level in the organization, and the total number of employees for the manufacturing process and the project via a second set of GUI tools, and to compare the direct labor activities corresponding to the manufacturing process flow structure and the skill functions of the employees in the organizational hierarchical structure to assign specific employees to fulfill the number of direct labor employees to perform the one or more direct labor activities at each of the plurality of organizational elements, further wherein the second set of GUI tools is configured to enter data stored in the database server, as entered by the user via the second set of GUI tools, and to display a visual representation of the fulfillment of assigning employees to organizational elements including the direct labor headcount, performance indicators and relationships between the two as generated by the processor, wherein specific data to be displayed as the visual representation is selectable by the user from a graphical user interface control element in a menu in the second set of GUI tools;

entering, by the user in the first set of GUI tools, the manufacturing process flow structure and the organizational hierarchical structure;

selecting, by the user, the graphical user interface control element in the menu in the second set of GUI tools;

in response to the selecting by the user, dynamically updating the second set of GUI tools with an updated visual representation of the fulfillment of assigning employees to organizational elements including the direct labor headcount, performance indicators and relationships between the two.

2. The system of claim 1 wherein each specific employee is assigned to fulfill the number of direct labor employees to perform the one or more direct labor activities at each of the plurality of organizational elements by matching the direct labor skill functions of the specific employee job profile to the plurality of direct labor activities.

3. The system of claim 1 wherein the organizational element is a lowest organizational level of the organization hierarchical structure.

4. The system of claim 1 wherein each of the plurality of direct labor activities and corresponding standard times are defined by industrial engineering principles.

5. The system of claim 1 wherein the objective of the project comprises a product and a number of the products to be manufactured.

6. The system of claim 1 wherein the performance indicators comprise a Direct Labor Efficiency metric defined as an output metric divided by a production time metric for a specific time period.

7. The system of claim 1 wherein the performance indicators comprise a Direct Labor Utilization metric.

8. The system of claim 1 wherein the project is a manufacturing project that includes a number of products to be manufactured, further wherein the headcount calculated per organizational element is a function of the direct labor activities corresponding to the organizational element, the standard time of each direct labor activity corresponding to the organizational element, and the number of products to be manufactured.

9. A system for determining headcount for a project and providing a visual representation of the project headcount, the system comprising:
a. a database server containing data for an objective of the project, data for a project task structure having multiple defined steps for completing the project, data for indirect labor activities, and data for an organizational hierarchical structure, wherein indirect labor activities are not directly involved in the manufacturing process;

b. an application and presentation system including a processor and a visualization tool, the visualization tool having a plurality of graphical user interface (GUI) tools, wherein a first set of GUI tools is configured for defining the project task structure and the organizational hierarchical structure, as entered by a user via the first set of GUI tools, wherein the project task structure defines, as entered by the user via the first set of GUI tools, a plurality of indirect labor activities to be performed to support completion of the project objective and defines, as entered by the user via the first set of GUI tools, a plurality of organizational elements wherein each organizational element is to perform one or more of the plurality of indirect labor activities, further wherein the organizational hierarchical structure defines the organizational hierarchical structure of an organization tasked with completing the project and includes a listing of employees, each employee is associated with an employee-specific job profile, as entered by the user via the first set of GUI tools, that defines indirect labor skill functions and responsibilities of the employee, wherein the processor, via programmed instructions, is configured to determine the indirect labor skill functions to support completion of the project, to calculate a number of indirect labor employees to perform the one or more indirect labor activities in each organizational element used to perform the indirect labor activities corresponding to the project, wherein the number of indirect labor employees is calculated according to parameters associated with each indirect labor activity and parameter values associated with each parameter, to sum the calculated number of indirect labor employees for each organizational element in the organization hierarchical structure used in the project to determine a total number of indirect labor employees for the project, to display a summed headcount for each organizational element, a summed headcount for each successive level in the organization, and the total number of indirect labor employees for the project via a second set of GUI tools, and to compare the indirect labor activities corresponding to the project task structure and the skill functions of the employees in the organizational hierarchical structure to assign specific employees to fulfill the number of indirect labor employees to perform the one or more indirect labor activities within each of the plurality of organizational elements, further wherein the second set of GUI tools is configured to enter data stored in the database server, as entered by the user using the second set of GUI tools, and to display a visual representation of the fulfillment of assigning employees to organizational elements including the indirect labor headcount, performance indicators and relationships between the two as generated by the processor, wherein specific data to be displayed as the visual representation is selectable by the user from a graphical user interface control element in a menu in the second set of GUI tools entering, by the user in the first set of GUI tools, the project task structure and the organizational hierarchical structure;

selecting, by the user, the graphical user interface control element in the menu in the second set of GUI tools;

in response to the selecting by the user, dynamically updating the second set of GUI tools with an updated visual representation of the fulfillment of assigning employees to organizational elements including the indirect labor headcount, performance indicators and relationships between the two.

10. The system of claim 9 wherein a specific parameter is a driver that represents a workload of one of the skill functions of an employee, and the parameter value is a measurement of a number of units of the workload for the specific parameter that a specific employee is to perform.

11. The system of claim 9 wherein one or more of the organizational elements is a department in the organizational hierarchical structure.

12. The system of claim 9 wherein each specific employee is assigned to fulfill the number of indirect labor employees to perform the one or more indirect labor activities at each of the plurality of organizational elements by matching the indirect labor skill functions of the specific employee job profile to the plurality of indirect labor activities.

13. The system of claim 9 wherein the organizational element is a lowest organizational level of the organization hierarchical structure.

14. The system of claim 9 wherein the objective of the project comprises a product and a number of the products to be manufactured.

* * * * *